United States Patent [19]
Suzuki et al.

[11] Patent Number: 5,506,642
[45] Date of Patent: Apr. 9, 1996

[54] PROJECTOR WITH PLASTIC MIRROR

[75] Inventors: Toshihiro Suzuki; Tetsuya Kobayashi; Tetsuya Hamada; Takeshi Goto, all of Kawasaki; Tsutomu Nagakari, Kagoshima; Hisashi Yamaguchi; Takashi Kanno, both of Kawasaki, all of Japan

[73] Assignee: Fujitsu Limited, Kawasaki, Japan

[21] Appl. No.: 360,152

[22] Filed: Dec. 20, 1994

Related U.S. Application Data

[63] Continuation-in-part of Ser. No. 352,576, Dec. 9, 1994, abandoned.

[30] Foreign Application Priority Data

Dec. 20, 1993 [JP] Japan ................. 5-320304

[51] Int. Cl.⁶ .................................. G03B 21/28
[52] U.S. Cl. ................... 353/74; 353/77; 353/98
[58] Field of Search ................. 353/74, 77, 78, 353/98; 348/794; 359/460, 456

[56] References Cited

U.S. PATENT DOCUMENTS

| | | | |
|---|---|---|---|
| 5,048,949 | 9/1991 | Sato et al. | 353/77 |
| 5,278,595 | 1/1994 | Nishida et al. | 353/74 |
| 5,379,080 | 1/1995 | Onozuka | 353/38 |

*Primary Examiner*—William C. Dowling
*Attorney, Agent, or Firm*—Greer, Burns & Crain, Ltd.

[57] ABSTRACT

A projector comprising liquid crystal display panels and a projection lens for projecting the modulated light to a screen. A back surface reflection mirror including a transparent plastic sheet and a reflecting film is arranged between the projection lens and the screen. The mirror is thin and light and may have optical anisotropy. In order to eliminate an uneven pattern appearing in the screen caused by optical isotropy of the mirror and the difference between the light distribution characteristics in the screen for P- and S-polarized light, the projection lens and the back surface reflection mirror are arranged in such a relationship that a wave normal vector of an arbitrary component of the light projected by the projection lens and made incident to the back surface reflection mirror is not parallel to the optical axis of the plastic sheet.

32 Claims, 26 Drawing Sheets

PROJECTOR WITH PLASTIC MIRROR

This application is a continuation-in-part of U.S. application, Ser. No. 08/352576, filed on Dec. 9, 1994 and now abandoned.

BACKGROUND OF THE INVENTION

1. Field of the Invention

The present invention relates to a projector which includes space modulation elements such as liquid crystal display panels for producing a modulated light and a projection lens for projecting the modulated light onto a screen for producing an image thereon. In particular, the present invention relates to a projector in which the modulated light projected by the projection lens is projected to the screen after the light is reflected by a back surface reflection mirror including a transparent plastic sheet and a reflecting film.

2. Description of the Related Art

Projectors can be classified into front surface type projectors and rear surface type projectors. In the front surface type projector, a reflective type screen is located on a vertical wall in a room, and a projection unit including liquid crystal display panels and a projection lens is arranged at the center in the room, whereby the modulated light is projected by the projection lens onto the screen for producing an image thereon. Observers can see the light reflected by the screen as an image. On contrast, in the rear surface type projector, a projection unit including liquid crystal display panels and a projection lens is arranged in the projector casing, and a light transmitting type screen is arranged on the front of the projector casing. Observers can see the modulated light which has passed through the screen.

Rear surface type projector having a larger screen, such as a screen with diagonal dimension in the range from 70 to 100 inches, has recently been developed. In the larger rear surface type projector, it is necessary that the distance between the projection lens and the screen is extended to, for example, 2.5 to 5 meters, and the projector casing must be enlarged. Accordingly, it has been proposed to arrange a mirror between the projection lens and the screen to reduce the depth of the projector casing.

Conventionally, a front surface reflection mirror made from glass is arranged between the projection lens and the screen. If a mirror is to be used for the above described purpose in a rear surface type projector having a screen having a diagonal dimension in the range from 70 to 100 inches, the size of the mirror will be, for example, 1.5 m×1.1 m. If such a large mirror is made from glass, the thickness of glass should be greater than 5 millimeters since glass is brittle and fragile. The weight of the mirror, which will be more than 20 kilogram, becomes a problem. In addition, the mirror is mounted to the projector frame by mirror holders, but the mirror holders must be also strong and heavy. Accordingly, the weight of the mirror assembly may be 20 kilogram to 50 kilogram, and the weight of the entire projector may be more than 100 kilogram.

Accordingly, it is conceived to make the mirror arranged between the projection lens and the screen from a plastic sheet which can be made thin and light because plastic is elastic and not brittle and because the specific weight of plastic is approximately 60 percent of the specific weight of glass.

The inventors have attempted to make a mirror from a transparent plastic sheet. The mirror was a back surface reflection mirror including a transparent plastic sheet and a reflecting film superposed on the plastic sheet. The light projected by the projection lens was made incident to the plastic sheet, was reflected by the reflecting film located on the back surface of the plastic sheet, and emerged from the plastic sheet. It was possible to reduce the thickness of the mirror to 100 μm or less by which the mirror is not damaged, and accordingly the weight of the mirror can be considerably reduced.

However, it has been found that an uneven pattern, or a fringe pattern, which will be described in detail later, appeared on the screen when a back surface reflection mirror including a transparent and thin plastic sheet and a reflecting film was used.

SUMMARY OF THE INVENTION

The object of the present invention is to provide a projector comprising a back surface reflection mirror including a transparent and thin plastic sheet and arranged between a projection lens and a screen, by which an uneven pattern, or a fringe pattern, appearing on the screen can be eliminated.

This object can be realized by one of the following features according to the present invention, in a projector comprising a light source, at least one space modulation element arranged to receive the light from said light source for producing a modulated light, at least one projection lens arranged to receive the modulated light for projecting the latter, a back surface reflection mirror including a transparent plastic sheet and a reflecting film superposed on the plastic sheet so that the light projected from the projection lens is made incident to the plastic sheet and reflected by the reflecting film, the transparent plastic sheet having optical anisotropy and at least one optical axis, and a screen arranged to receive the light reflected by the back surface reflection mirror for producing an image thereon.

(a) The projector is characterized in that the projection lens and the back surface reflection mirror are arranged in such a relationship that an arbitrary component of the light projected by the projection lens and made incident to the back surface reflection mirror is not parallel to the at least one optical axis of the plastic sheet.

(b) The projector is characterized in that there is the relationship of $$\Delta PH < 0.1$$

where R, G, and B in the following parentheses are representative of red, green and blue components, A(R), A(G), and A(B) are the amounts of the light projected onto the screen as a first polarized light, B(R), B(G), and B(B) are the amounts of the light projected onto the screen as a second polarized light perpendicular to the first polarized light, $A(R) \geq B(R)$, $A(G) \geq B(G)$, $A(B) \geq B(B)$, G(R,p), G(G,p), and G(B,p) are the gains of the screen for a third polarized light, G(R,s), G(G,s), and G(B,s) are the gains of the screen for a fourth polarized light perpendicular to the third polarized light, $G(R,p) \geq G(R,s)$, $G(G,p) \geq G(G,s)$, and $G(B,p) \geq G(B,s)$, and $$\Delta(R) = [A(R) \times G(R,p) + B(R) \times G(R,s)] - [A(R) \times G(R,s) + B(R) \times G(R,p)]$$

$$\Delta(G) = [A(G) \times G(G,p) + B(G) \times G(G,s)] - [A(G) \times G(G,s) + B(G) \times G(G,p)]$$

$$\Delta(B) = [A(B) \times G(B,p) + B(B) \times G(B,s)] - [A(B) \times G(B,s) + B(B) \times G(B,p)]$$

$\Delta PH = |\Delta(R) - \Delta(B)| + |\Delta(G) - \Delta(B)|$.

(c) Said screen has a first light distribution characteristic for vertical linearly polarized light and a second light distribution characteristic for horizontal linearly polarized light, the first light distribution characteristic differing from the second light distribution characteristic.

The projector is characterized in that the light projected by the projection lens and made incident to the back surface reflection mirror is a generally non-polarized light defined by the relationship of $$\frac{A \times P + B \times S}{A \times S + B \times P} \leq 1.1,$$

where P and S are gains of the screen in the first and second light distribution characteristics at a particular angle at which it is desired to obtain a clear image, with $P \geq S$, and A and B are the amounts of the linearly polarized light projected to the screen, with $A \geq B$.

(d) The projector is characterized in that there is the relationship of $$\left| \frac{2d}{\sqrt{1 - \{\sin\theta/n(C1)\}^2}} \times \frac{\Delta n(C1)}{\lambda(C1)} - \frac{2d}{\sqrt{1 - \{\sin\theta/n(C2)\}^2}} \times \frac{\Delta n(C2)}{\lambda(C2)} \right| \geq 1$$

where "d" is the thickness of the plastic sheet in the mirror, $\lambda(C1)$ and $\lambda(C2)$ are cut-off wavelengths defining a bandwidth in each color, n(C1) and n(C2) are the double refractive indices at the cut-off wavelengths in each color, n(C1) and n(C2) are the refractive indices at the cut-off wavelengths in each color, and θ is an incident angle to the mirror.

(e) The projector is characterized in that the light projected by the projection lens and substantially converging at one point on the screen has an angular dispersion, and a phase difference of the light which passes through the transparent plastic sheet is generally greater than one wavelength of the light.

(f) The projector is characterized in that the modulated light diverging from substantially one point of the space modulation element is in a generally regularly polarized state with respect to the diverging angle, and a polarized light converting element is provided for converting a generally regularly polarized state with respect to the diverging angle into an irregularly polarized state with respect to the diverging angle.

The inventors have found that an uneven pattern appears on the screen when the mirror is made from a transparent plastic sheet and the following conditions exist; (a) polarized light is made incident to the mirror, (b) a phase difference of polarized light occurs due to optical anisotropy of the plastic sheet in the mirror, and (c) the screen has light distribution characteristics for P- and S-polarized light components. Accordingly, the above described solutions can eliminate an uneven pattern otherwise appearing in the screen, by cancelling one of these conditions, in particular by adequately converting the polarized light made incident to the mirror, reducing a phase difference of polarized light beams occurring when the light passes through the mirror due to optical anisotropy of the plastic sheet in the mirror, and reducing the difference in light distribution characteristics of the screen.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Basic Arrangement

Figure 1:
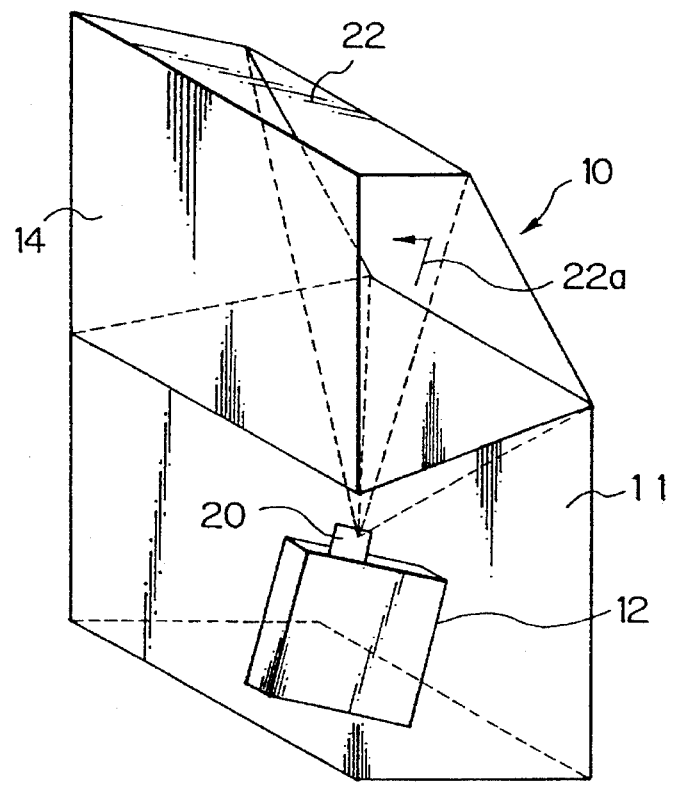
FIG. 1 is a simplified perspective view of the projector according to the present invention.
Figure 2:
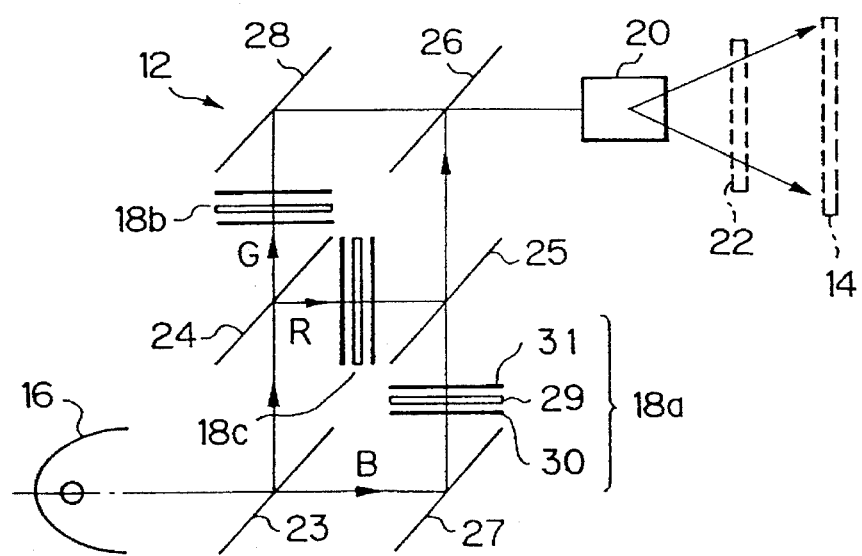
FIG. 2 is a view illustrating the components of the projection unit of FIG. 1.
Figure 3A:
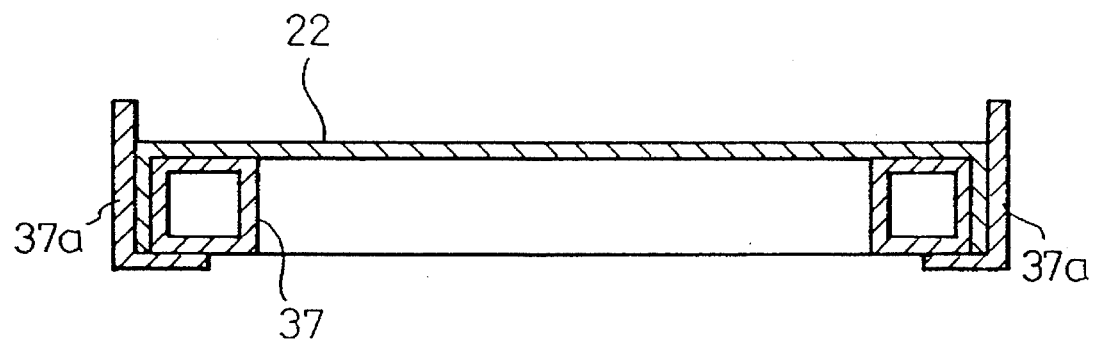
FIG. 3A is a cross-sectional view of the back surface reflection mirror of FIG. 1.
Figure 3B:
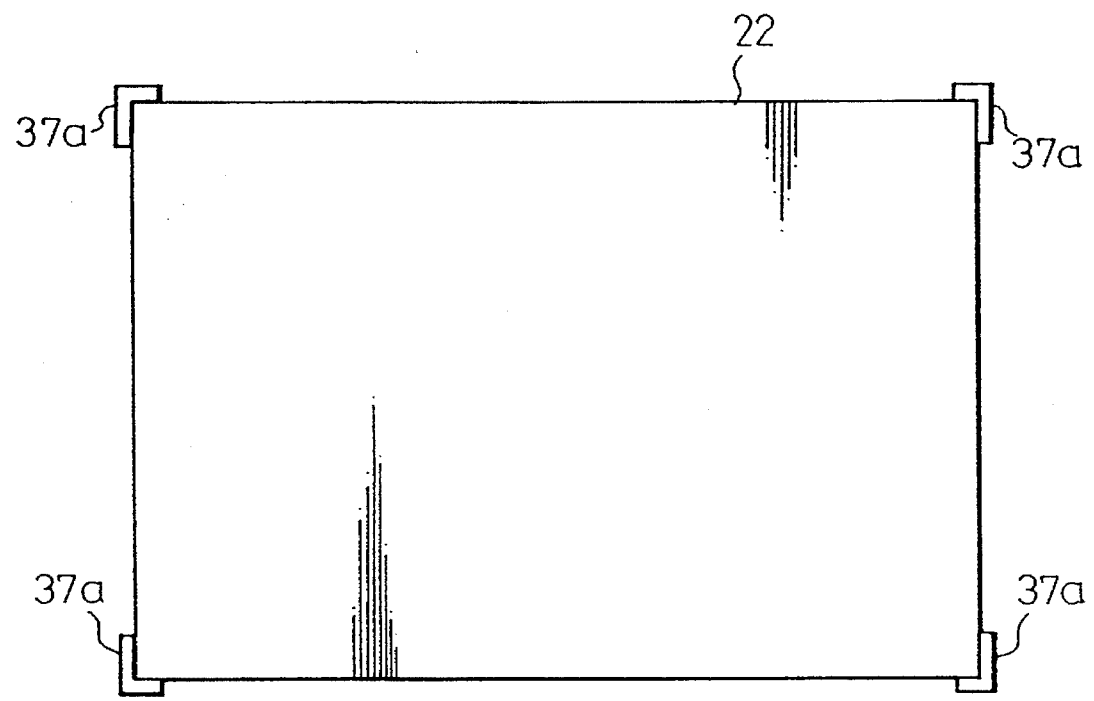
FIG. 3B is a plan view of the mirror of FIG. 3A.
Figure 4:
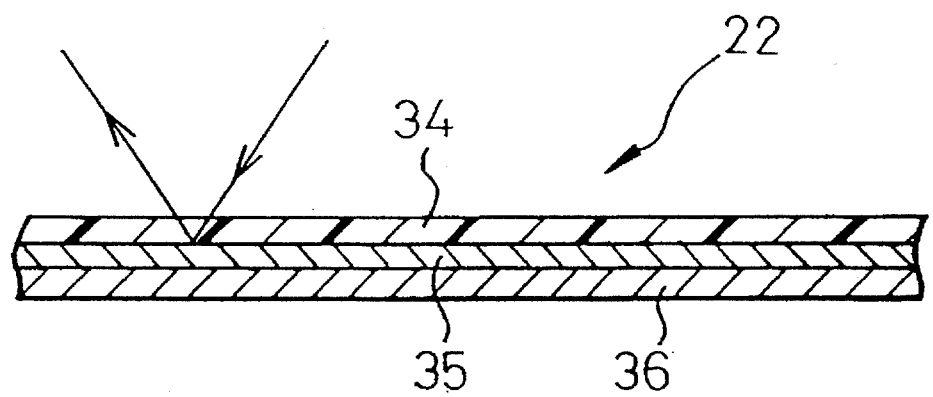
FIG. 4 is a cross-sectional view of a portion of the mirror of FIGS. 3A and 3B.
Figure 5:
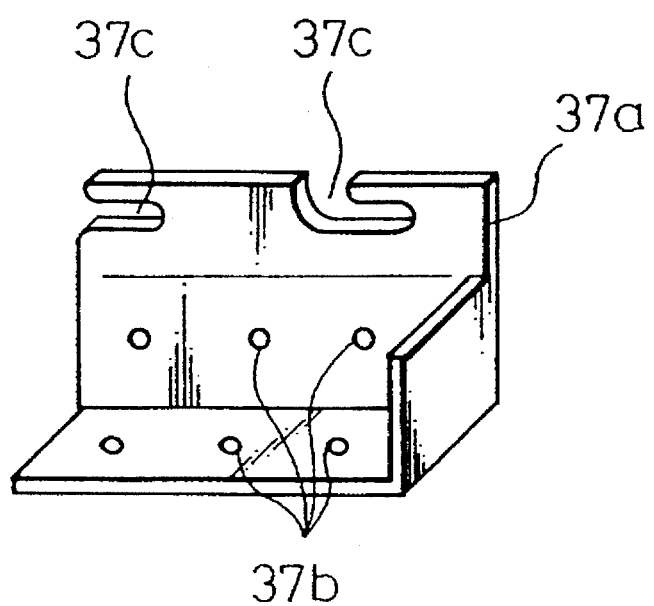
FIG. 5 is a perspective view of the mirror holder of FIGS. 3A and 3B.

FIGS. 1 and 2 show the rear surface type projector 10 according to the first embodiment of the present invention. The projector 10 comprises a projector casing 11, a projection unit 12 arranged in the projector casing 11, and a transmitting type screen 14 arranged in the front of the projector casing 11. The projection unit 12 includes a light source 16, liquid crystal display elements 18a, 18b, and 18c as space modulation elements, and a projection lens 20. A mirror 22 is arranged between the projection lens 20 and the screen 14 to bend the light as shown by the arrow 22a in FIG. 1 so as to reduce the depth of the projector casing 11, compared with the case where the light travels straight from the projection lens 20 to the screen 14, as comparatively shown in FIG. 2.

In FIG. 2, the projection unit 12 also includes color separating dichroic mirrors 23 and 24, color combining dichroic mirrors 25 and 26, and total reflection mirrors 27 and 28. The light emitted from the light source 16 is separated by the color separation dichroic mirror 23 into a blue component B and the other color components. The blue component B is reflected by the total reflection mirror 27 to the liquid crystal display element 18a and further travels to the projection lens 20 via the color combination dichroic mirrors 25 and 26. The color components other than the blue component B, which are reflected by the color separation dichroic mirror 23, are separated by the color separation dichroic mirror 24 into a red component G and a green component G. The red component G passes through the liquid crystal display element 18c and travels to the projection lens 20 via the color combination dichroic mirrors 25 and 26. The green component G passes through the liquid crystal display element 18b and travels to the projection lens 20 via the total reflection lens 28 and the color combination dichroic mirror 26.

Each liquid crystal display element 18a, 18b, or 18c comprises a liquid crystal panel 29 including a TN-type liquid crystal, a polarizer 30 and an analyzer 31. The polarizer 30 and the analyzer 31 have transmitting axes arranged mutually perpendicularly. Each liquid crystal display element 18a, 18b, or 18c receives the light from the light source 16 and produces modulated light depending on the applied voltage for producing an image. The projection lens 20 projects the modulated light passing through the liquid crystal display elements 18a, 18b and 18c onto the mirror 22 in order to project the modulated light to the screen 14. The light projected by the projection lens 20 diverges to produce a magnified image on the screen 14, as shown in FIG. 2.

As shown in FIGS. 3A to 5, the mirror 22 comprises a back surface reflection mirror including a transparent plastic sheet 34 and a reflecting film 35 superposed on the plastic sheet 34. The light projected by the projection lens 20 is made incident to the plastic sheet 34, reflected by the reflecting film 35, and emerges from the plastic sheet 34, as shown by the arrow in FIG. 4. In the embodiment, the screen 14 has a diagonal dimension of 70 inch, and the size of the mirror 22 is 1,430 mm×1,100 mm. The plastic sheet 34 comprises a polyester sheet having the thickness in the range from 25 to 30 μm, and the reflecting film 35 comprises a metal such as silver or aluminum having the thickness of several thousand angstrom which is vapor-deposited on the plastic sheet 34. A protective film 36 of chromoxide or PMMA which is also vapor-deposited on the film.

The mirror 22 is stretched on an annular, rectangular aluminum frame 37 and adhered to the side surfaces of the frame 37 after an appropriate tension is applied to maintain the mirror 22 in a flat condition. Mirror holders 37a are attached to the four corners of the frame 37. Each holder 37 has holes 37b for fixing the holder 37 to the aluminum frame 37, and grooves 37c for mounting the mirror 22 to the projector frame 11. The total weight of the mirror assembly is approximately 11 kilogram. The projector 10 having the mirror 22 can realize a high definition screen of 280×1024 pixels without distortion.

Figure 6:
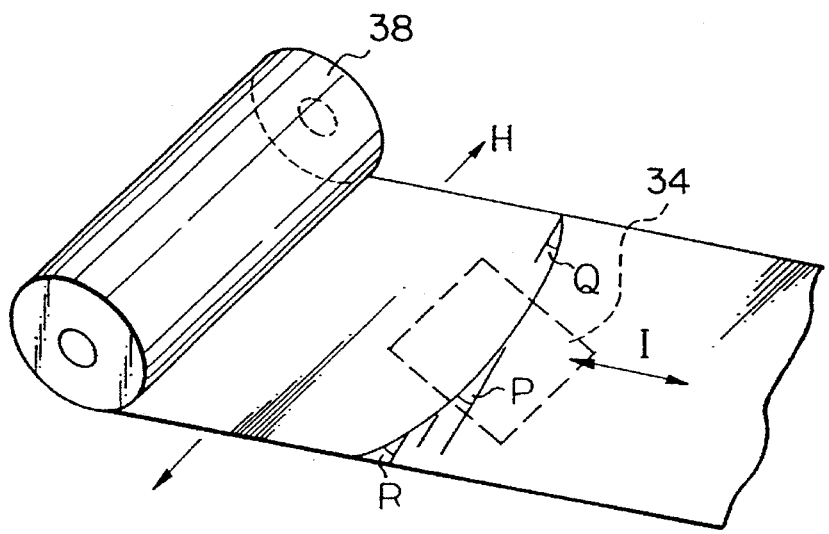
FIG. 6 is a perspective view of a roll of plastic sheet which is stretched to obtain the plastic sheet of the mirror of FIGS. 3A to 5.

The plastic sheet 34 is provided in the form of the roll 38 of polyester film, as shown in FIG. 6. The plastic sheet 34 is unwound from the roll 38, and stretched in the longitudinal direction I and in the transverse direction H. The stretched plastic sheet 34 has optical anisotropy and two optical axes. The optical axes usually exist in a plane which is perpendicular to the sheet of FIG. 6 and generally parallel to the transverse direction H, but a bowing phenomena occurs as illustrated by the curved line in FIG. 6. The optical axes exist on the curved line in FIG. 6. In FIG. 6, for example, the curved line forms the angle P, Q or R relative to the transverse direction H. Accordingly, the plastic sheet 34 is obliquely cut from the stretched sheet so that one side of the plastic sheet 34 is generally parallel to a portion of the curved line.

In the embodiment of FIG. 6, the plastic sheet 34 is cut so that the center of one side of the plastic sheet 34 is parallel to a portion of the curved line. However, the present invention is not limited to this arrangement. In addition, it is also possible to arrange the plastic sheet 34 such that the optical axis thereof is parallel to the plane of the sheet of FIG. 6, i.e., parallel to the surface of the plastic sheet 34, depending on the way of stretching.

Figure 7:
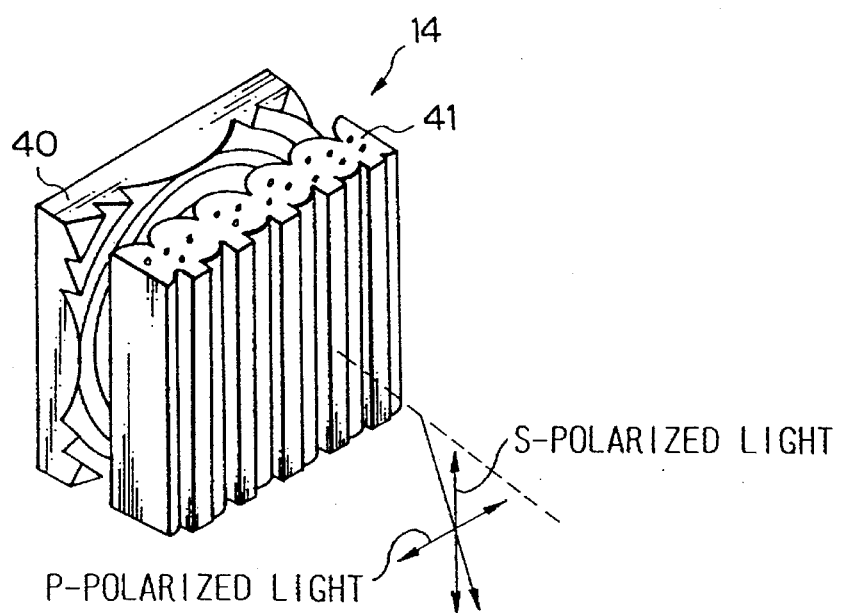
FIG. 7 is a diagrammatic perspective view of the screen of FIG. 1.

FIG. 7 shows the detailed structure of the transmitting type screen 14 used in the rear surface reflection projector 10. The screen 14 comprises the combination of a circular fresnel lens 40 and a double sided lenticular lens 41. The double sided lenticular lens 41 is made by the steps of making a simple diffusion plate in which diffusion particles such as small beads are mixed in the material and then pressing the simple diffusion plate so that peaks and valleys vertically extend on the surfaces of the plate. Alternatively, it is possible to make a similar lenticular lens 41 by the combination of a simple diffusion plate and separate lenticular lenses.

The fresnel lens 40 bends the divergent light from the projection lens 20 so that the light becomes parallel to the optical axis of the projection lens 20 or rather convergent in the vertical sense, so as to determine the vertical viewing angle. The lenticular lens 41 causes the light to be diffused by the diffusion particles and to be horizontally distributed by the oblique surfaces of vertical peaks and valleys of the lenticular lens 41 so that an observer can see the light impinging on any point on the screen 14 from any horizontal direction.

Figure 8:
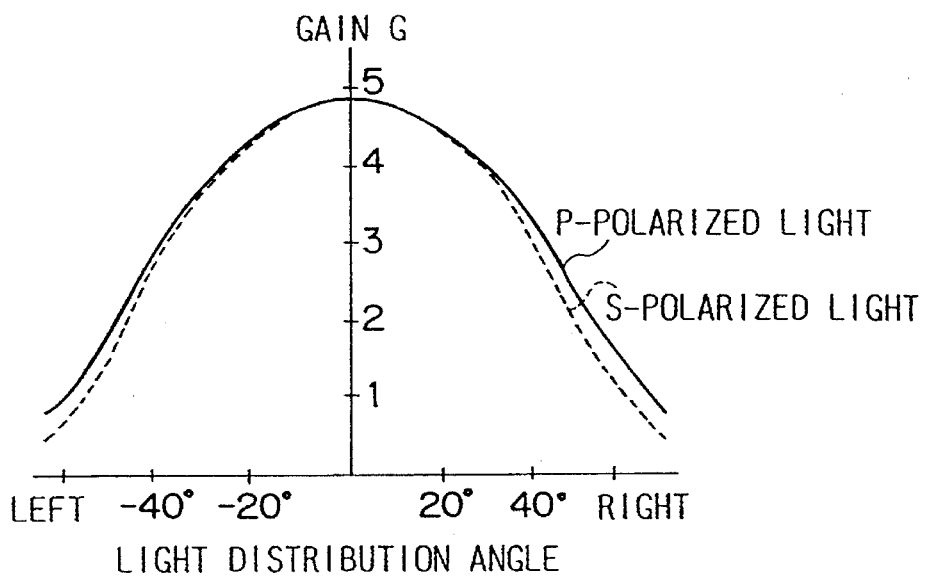
FIG. 8 is a view illustrating the light distribution characteristics of the screen of FIG. 7.

FIG. 8 shows the light distribution characteristics of this screen 14. The light distribution angle corresponds to the viewing angle relative to the normal of the screen 14 at which the screen is viewed. The gain in the normal direction (i.e., at the distribution angle=0) is approximately 5. It should be noted that, in FIG. 8, the light distribution characteristic of P-polarized light with respect to the screen 14 differs from that of S-polarized light. In particular, the difference between the light distribution characteristics of the P-polarized light and the S-polarized light becomes larger as the light distribution angle is greater, and particularly more than 30 or 40 degrees. As shown in FIG. 7, the light refracts mainly in the horizontal direction when the light is incident to the lenticular lens 41, and thus the incident-refractive (reflective) plane extends horizontally. Accordingly, P-polarized light with respect to the surface of the lenticular lens 41 of the screen 14 is a linear polarized light having a horizontal plane, and S-polarized light a linear polarized light having a vertical plane. The difference in the light distribution characteristics with respect to P- and S-polarized light is based on the known fact that the reflectivity of P-polarized light differs from that of S-polarized light.

Uneven Pattern

Figure 9:
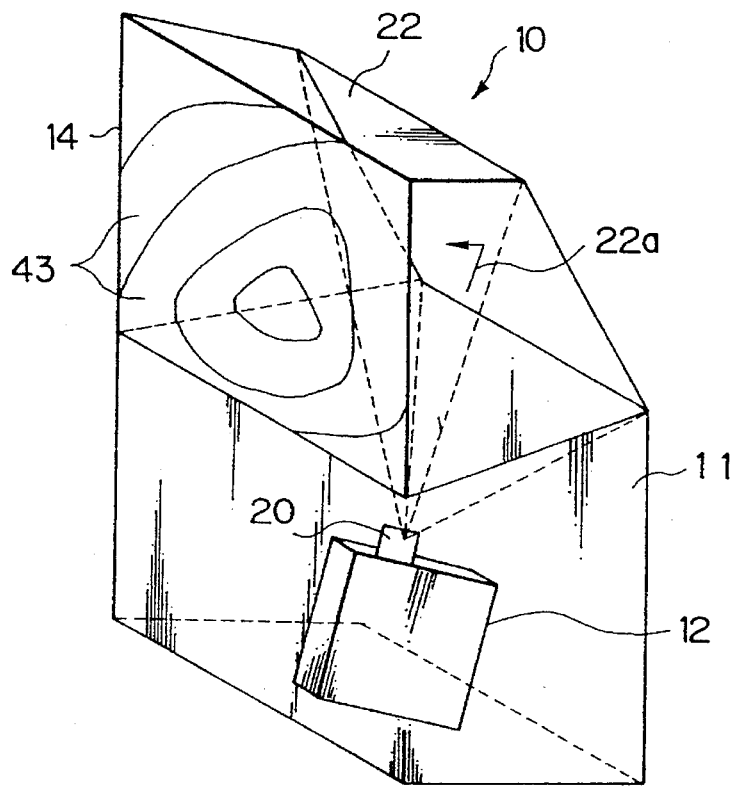
FIG. 9 is a view of the projector, similar to FIG. 1, but illustrating an uneven pattern appearing in the screen when the mirror including the plastic sheet is used.

In the first attempt, a projector similar to the projector 10 in FIG. 1 was manufactured without any special consideration, and an image on the screen 14 was observed. As a result, an uneven pattern 43 in the form of a fringe pattern appeared in the screen 14 at the viewing angle of 30 to 60 degrees, as shown in FIG. 9. The uneven pattern 43 was a brightness variation in the case of a monochromatic display and a color variation when the image is entirely white in the case of a color display. The variation of chromaticity is in the range of, for example, $0.2 \leq x \leq 0.5$, and $0.2 \leq y \leq 0.5$. When the mirror 22 was made from glass, such uneven pattern 43 did not appear. Accordingly, it is believed that the uneven pattern 43 appeared because the mirror 22 is made from the plastic sheet.

The inventors thus started to study the mechanism by which the uneven pattern 43 appears, and discovered a way to eliminate the uneven pattern 43. The details are described below.

Figure 10:
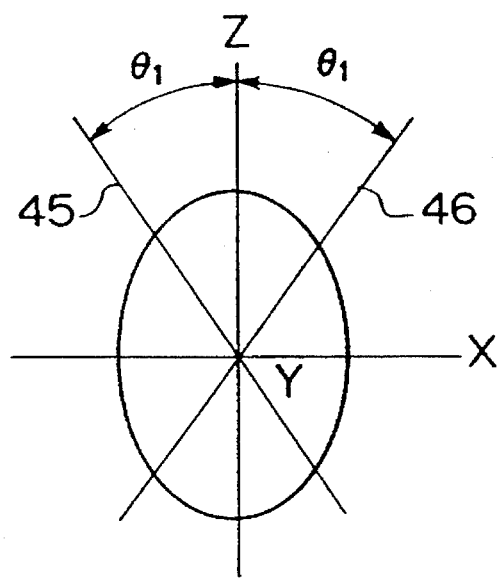
FIG. 10 is a diagrammatic view illustrating an ellipsoid of refractive index.

FIG. 10 shows a known ellipsoid of refractive index. In FIG. 10, the X-axis and the Z-axis extend in the plane of the sheet, and the Y-axis extends perpendicular to the plane of the sheet. In a body having optical anisotropy in which refractive indices in X-axis, Y-axis and Z-axis are different from each other, it is known that two optical axes 45 and 46 exist in the plane including X-axis and Z-axis and form the angle of $\pm\theta_1$ to Z-axis. As is well known, the optical axis is defined such that when the light propagates in the direction of the optical axis, optical anisotropy does not appear and thus this condition seems isotropic.

Figure 11:
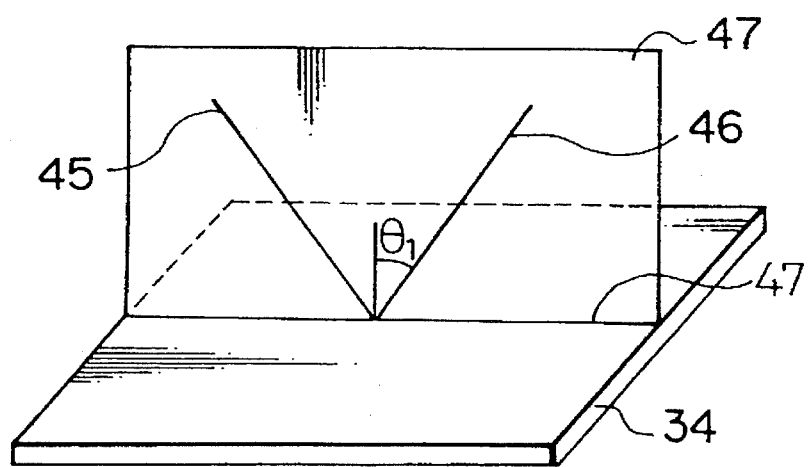
FIG. 11 is a diagrammatic view illustrating the relationship between the optical axis plane and the plastic sheet.

FIG. 11 shows that a plane (referred to an optical axis plane) 47 containing the optical axes 45 and 46 of the plastic sheet 34 in the mirror 22 extends perpendicular to the surface of the plastic sheet 34. The plastic sheet 34 in the mirror 22 has an identical optical property to that of body of the ellipsoid of refractive index in FIG. 10. When the plastic sheet 34 in the mirror 22 comprises polycarbonate, the angle $\theta_1 = 90$ degrees. That is, the optical axis of the plastic sheet 34 is generally parallel to the surface of the plastic sheet 34. When the plastic sheet 34 in the mirror 22 comprises polyester having biaxial anisotropy, the angle $\theta_1$ is in the range from 20 to 40 degrees. The angle $\theta_1$ changes depending on the stretching condition. The angle $\theta_1$ was approximately 27 degrees when the sheet 34 is obtained in the manner described with reference to FIG. 6.

Figure 12:
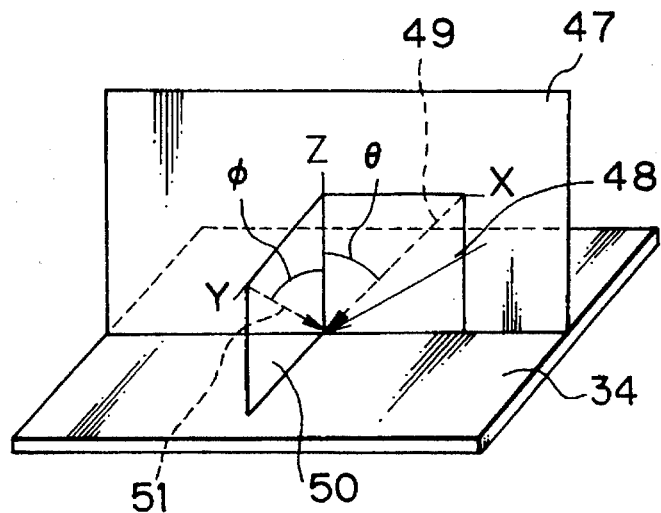
FIG. 12 is a diagrammatic view illustrating the definition of the incident angle to the plastic sheet.

FIG. 12 shows an arbitrary light 48 incident to and propagating in the plastic sheet 34 at an arbitrary angle. Here, the angle between the projection 49 of the incident light 48 on the optical axis plane 47 in the plastic sheet 34 and Z-axis is "$\theta$", and the angle between the projection 51 of the incident light 48 on the plane 50 perpendicular to the optical axis plane 47 and extending in the Y-axis direction and Z-axis is "$\phi$". That is, the incident angle in the plastic sheet 34 is defined by $\theta$ and $\phi$.

The linear polarized light incident to the plastic sheet 34 in the mirror 22 at an arbitrary angle is separated into one component vibrating in the slow axis direction and another component vibrating in the fast axis direction. Two components are reflected by the reflection film 35, and again pass through the plastic sheet 34. When two components emerge from the plastic sheet 34, they become a single polarized light beam having a phase which is different from that of the incident polarized light.

Figure 13:
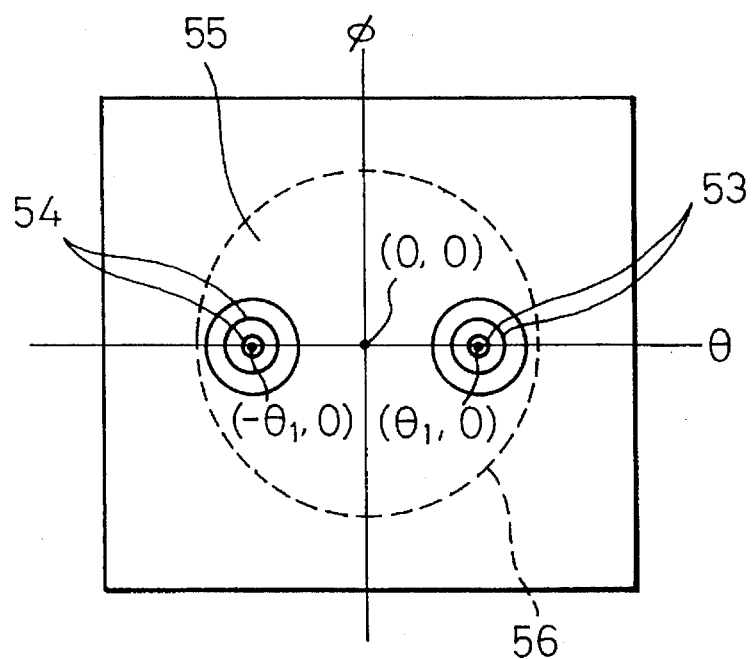
FIG. 13 is a view illustrating the phase distribution of the polarized light emerging from the mirror.

FIG. 13 shows the result of the study of the phase difference between the incident polarized light to the plastic sheet 34 and the emerging polarized light from the plastic sheet 34 when the linear polarized light is made incident to the plastic sheet 34 in the mirror 22 at various arbitrary angles and emerges from the plastic sheet 34 (i.e., the mirror 22) after the reflection by the reflection film 35. The horizontal axis is the angle θ and the vertical axis is the angle φ. The greater the angle θ, the greater the incident angle along the optical axis plane 47, and the greater the angle φ, the greater the incident angle along the plane 50 perpendicular to the optical axis plane 47.

In FIG. 13, two groups of substantially concentric isophase-difference lines 53 and 54 are formed about a point ($\theta_1$, 0) and about a point ($-\theta_1$, 0) where the incident angle of the polarized light is parallel to the optical axes 45 and 46, respectively. The iso-phase-difference lines 53 and 54 are arranged in a dense arrangement about the respective points ($\theta_1$, 0) and ($-\theta_1$, 0). There is an isophase-difference region 55 between the regions of the isophase-difference lines 53 and 54. The isophase-difference line is a continuity of points at which phases (or polarization states) of the emerging polarized light beams are identical to each other, when polarized light beams in a uniform polarization state are incident to the plastic sheet 34 and-polarized light beams emerging from the plastic sheet 34 after reflection by the mirror surface may have different phases (or polarization states) from that of the incident polarized light beams. In addition, the phase difference changes depending on the wavelength of the incident light, and if white light is supplied, the state of polarization changes for red, green and blue light components.

A total reflection boundary line 56 also exists, encircling two groups of iso-phase-difference lines 53 and 54. That is, the light, which is made incident to and propagates through the plastic sheet 34 at an angle located outside the total reflection boundary line 56, and reflected by the reflection film 35, cannot emerge from the plastic sheet 34. Therefore, the light, which is made incident to the mirror 22 at an angle corresponding to one located outside the total reflection boundary line 56, cannot be used. Needless to say, regarding the total reflection angle, there is the relationship of $\alpha = \sin^{-1}(1/n)$ or $n \sin \alpha = 1$.

Figure 14:
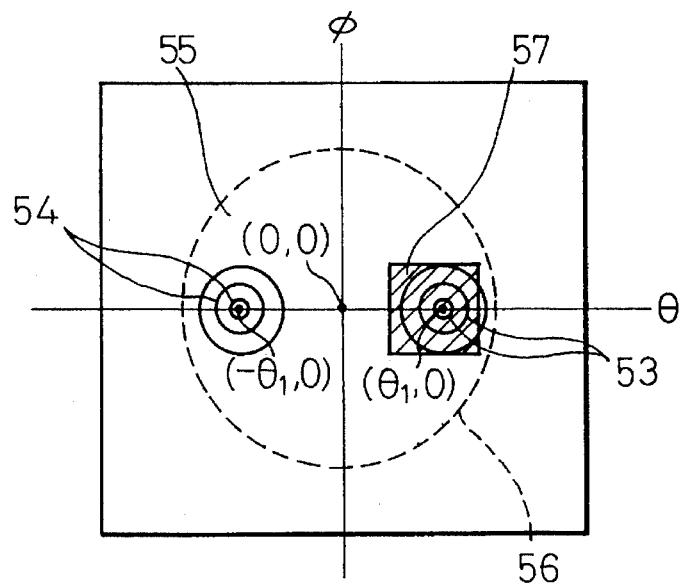
FIG. 14 is a view illustrating the area of the incident light in which the uneven pattern of FIG. 9 appears.

In the projector presenting the uneven pattern 43 of FIG. 9, the projection lens 20 and the mirror 22 were arranged in such a relationship that the incident angles of the light projected by the projection lens 20 and propagating through the plastic sheet 34 of the mirror 22 are within the region 57 in FIG. 14. The divergent light is projected by the projection lens 20, and the divergent light includes a component travelling along the optical axis of the projection lens 20 and components travelling at various angles relative to the optical axis of the projection lens 20. That is, the light is incident to the mirror 22 at various incident angles within the region 57 of FIG. 14. The center of the region 57 is the point ($\theta_1$, 0), and a component of the light travelling along the optical axis of the projection lens 20 is parallel to the optical axis 46 of the plastic sheet 34. This region 57 includes the area of the dense isophase-difference lines 53.

Figure 15:
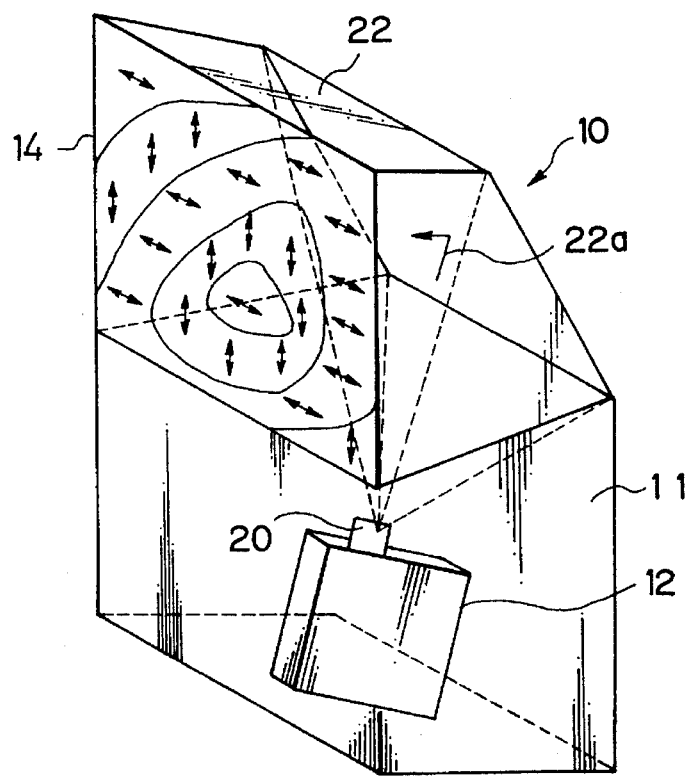
FIG. 15 is a view illustrating the state of the polarized light incident to the screen, with phase difference produced according to the incident angle of FIG. 14.

Therefore, as shown in FIG. 15, although the light made incident to the mirror 22 is a uniform linear polarized light, the light reflected by the mirror 22 and made incident to the screen 14 includes various linear polarized lights having a various vibrating planes corresponding to the phase differences derived from the iso-phase-difference lines 53, and there are elliptical polarized lights at the boundaries between the lines 53.

As described previously with reference to FIG. 8, there is a difference between the light distribution characteristics of P-polarized light and S-polarized light. In this case, P-polarized light has a horizontal vibrating plane regarding the screen 14 and S-polarized light has a vertical vibrating plane regarding the screen 14. Therefore, at a position of the screen 14 where mainly a linear polarized light having a vibrating plane corresponding to P-polarized light regarding the screen 14 is incident to the mirror 22, the brightness of the screen 14 becomes higher since the amount of the light passing through the screen 14 in the state of P-polarized light is higher, as shown in FIG. 8. Conversely, at a position of the screen 14 where mainly a linear polarized light having a vibrating plane corresponding to S-polarized light regarding the screen 14 is incident to the mirror 22, the brightness of the screen 14 becomes lower since the amount of the light passing through the screen 14 in the state of S-polarized light is lower, as shown in FIG. 8. It is considered that the uneven pattern 43 of FIG. 9 appears in this manner, as a brightness variation in the monochromatic display and as a color variation in the color display.

In summary, it can be concluded that the uneven pattern 43 of FIG. 9 appears when (a) a uniform polarized light is made incident to the mirror 22, (b) a polarized light reflected by the mirror 22 has a distributed phase difference due to anisotropy of the plastic film 34 in the mirror 22, and (c) there is a difference between the light distribution characteristics in the vertical direction and in the horizontal direction in the screen 14, are appropriately combined under certain conditions.

Accordingly, the present invention aims to eliminate the uneven pattern 43 of FIG. 9, by removing one or more of such conditions.

First Solution

Figure 16A:
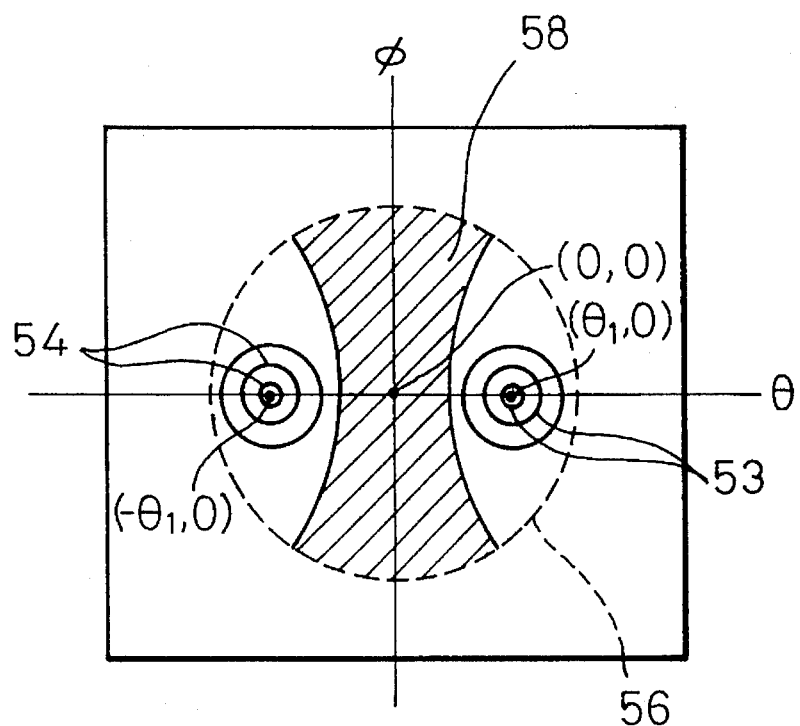
FIG. 16A is a view illustrating the area of the incident light determined according to the first embodiment of the present invention.
Figures 16B, 16C:
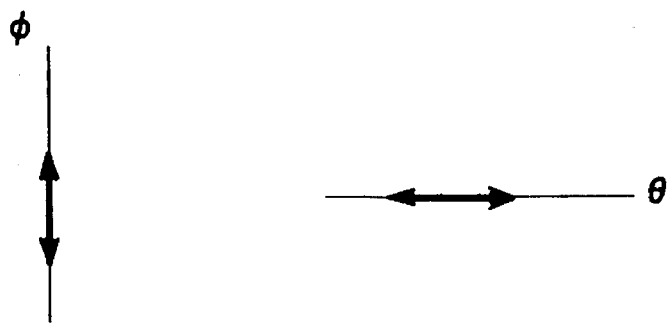
FIG. 16B is a view of the polarized light having a vibrating plane parallel to the φ axis which is perpendicular to the θ axis.
FIG. 16C is a view of the polarized light having a vibrating plane parallel to the θ axis.

FIGS. 16A to 16C show the first solution according to the present invention. The identical reference numerals are used to the identical elements throughout the Figures. The feature of FIG. 16A can be applied to the projector 10 of FIGS. 1 and 2 comprising the projector lens 20, the mirror 22 including the plastic film 34 and the reflection film 35, and the screen 14.

FIG. 16A is a view similar to FIG. 13, except for the design of the incident angle of the light projected by the projector lens 20 and made incident to the mirror 22. FIG. 16A shows the distribution of the phase difference between the incident polarized light and the emerging polarized light when the linear polarized light is made incident to the plastic sheet 34, similarly to FIG. 13. The horizontal axis is the angle θ and the vertical axis is the angle φ. Similarly to the distribution in FIG. 13, two groups of substantially concentric isophase-difference lines 53 and 54 are formed about the point ($\theta_1$, 0) and about the point ($-\theta_1$, 0). Two iso-phase-difference lines 53 and 54 are arranged in a dense arrangement.

In FIG. 16A, a waisted isophase-difference region 58 exists within the total reflection boundary line 56 and extends between two isophase-difference lines 53 and 54. The property of this phase-difference region 58 is similar to that of the region 55 in FIG. 13.

In this embodiment, the projection lens 20 and the mirror 22 are arranged so that the incident angle of the light projected by the projector lens 20 and made incident to the plastic sheet 34 of the mirror 22 exists only within the region 58. As described previously, the divergent light emerging from the projection lens 20, includes a light component passing through the optical axis of the projection lens 20 and other light components travelling at various angles relative to the optical axis of the projection lens 20. The incident angles of the light components of the divergent light made incident to the mirror 22 are within the region 58 in FIG. 16A. It should be noted that the region 58 does not include the point $(-\theta_1, 0)$ and the point $(\theta_1, 0)$, so any one of the light components of the divergent light projected by the projector lens 20 is not parallel to the optical axis 45 or 46. That is, the wave normal vector of an arbitrary light component of the light projected by the projection lens 20 and made incident to the back surface reflection mirror 22 is not parallel to the optical axis 45 or 46 of the plastic sheet 34.

Preferably, the linear polarized light emerging from the projector lens 20 has a vibrating plane which is parallel to the θ-axis corresponding to the optical axis plane 47 or to φ-axis perpendicular to the θ-axis, as shown in FIGS. 16B and 16C. By this arrangement, the vibrating plane of the linear polarized light made incident to the mirror 22 is the same as the vibrating plane of the linear polarized light reflected by the mirror 22 and projected to the screen 14.

The projection lens 20 and the mirror 22 having the feature of FIG. 16A can be used in combination with the screen 14 having the feature of FIGS. 7 and 8 in which the light distribution characteristic in the horizontal direction differs from the light distribution characteristic in the vertical direction. In this case, the uneven pattern 43 of FIG. 9 does not appear since there is no substantial distribution of phase difference in the polarized light reflected by the mirror 22, despite the fact that there is a difference in the light distribution characteristics in the screen 14.

Figure 17:
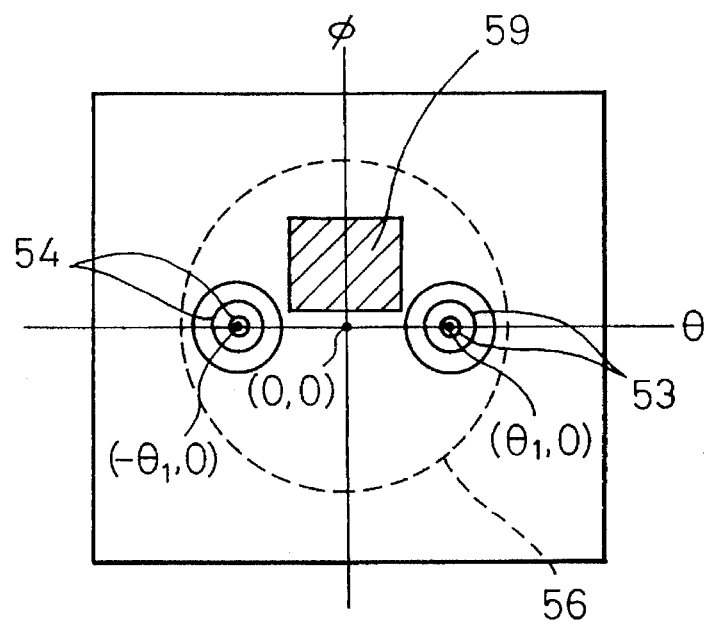
FIG. 17 is a view illustrating the area of the incident light modified from that of FIG. 16A.
Figure 18:
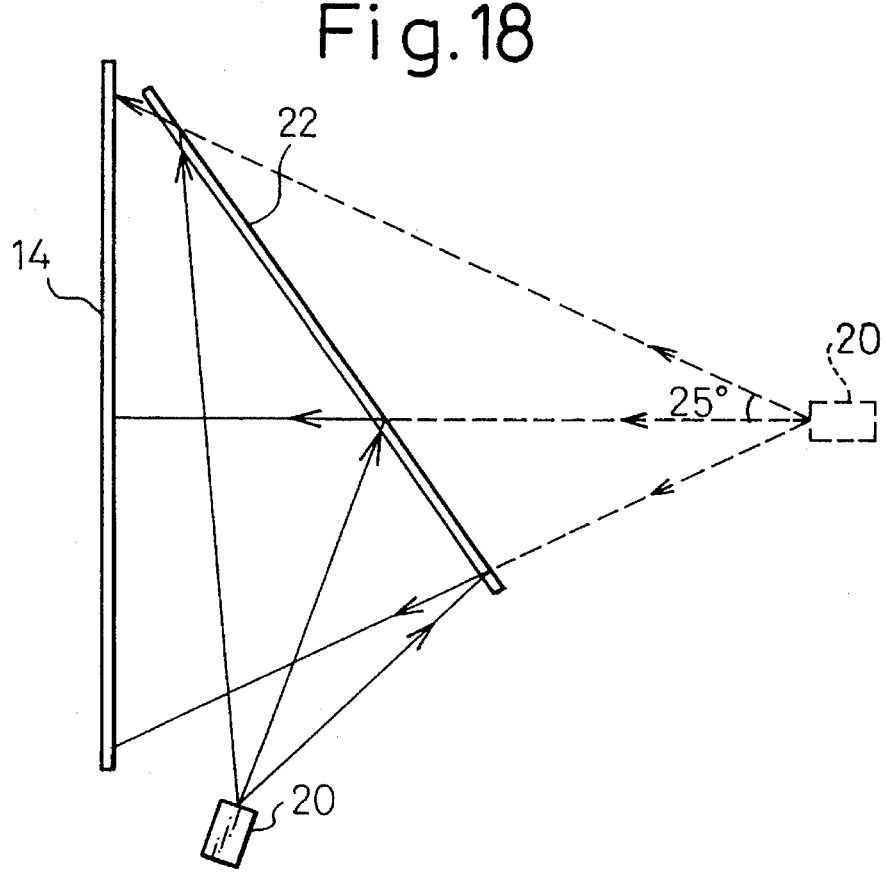
FIG. 18 is a view of the projection lens and the mirror arranged corresponding to FIG. 17.

FIG. 17 shows a preferred example modified from the arrangement of FIG. 16A. FIG. 18 shows the arrangement of the projection lens 20 and the mirror 22 corresponding to the arrangement of FIG. 17.

In FIG. 17, the incident angle of the light projected by the projector lens 20 and made incident to the mirror 22 are within the region 59. This region 59 corresponds to a part of the region 58 in FIG. 16A, and the incident angle is allowed to exist only one side of the θ axis. As shown in FIG. 18, the projection lens 20 is arranged in a vertical center plane of the mirror 22 and is aimed at the mirror 22 from below the mirror 22. Also, the linear polarized light passing through the axis of the projector lens 20 has a vibrating plane corresponding to that in FIG. 16B or FIG. 16C, and thus the reflected linear polarized light is incident to the screen 14 as P-polarized light or as S-polarized light. As a result, the state of polarization of the projected light is uniform at the incident surface of the screen 14, and therefore, there is no brightness variation in a monochromatic display and no color variation in a color display.

Figure 19:
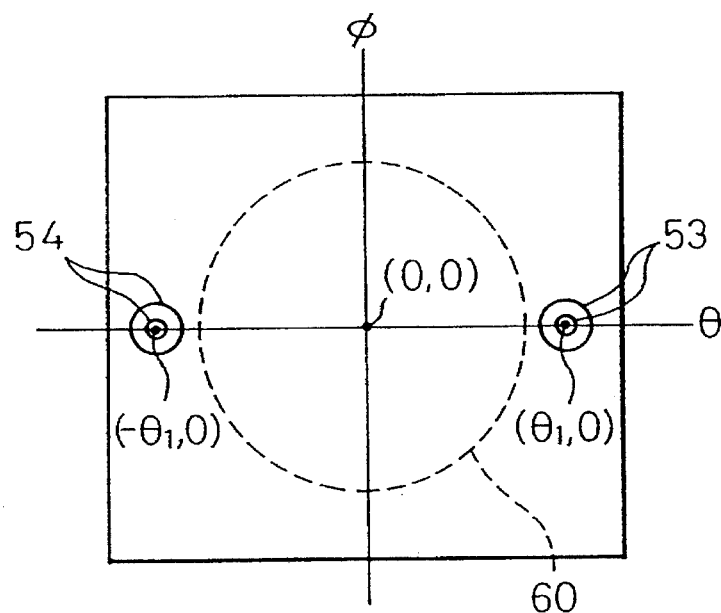
FIG. 19 is a view illustrating the area of the incident light determined according to the second embodiment of the present invention.

FIG. 19 shows the second embodiment of the present invention. In the previous embodiment, the total reflection boundary line 56 exists outside the points $(-\theta_1, 0)$ and $(\theta_1, 0)$ where the incident angle of the polarized light is parallel to the optical axes 45 and 46. In FIG. 19, the total reflection boundary line 60 exists inside these points $(-\theta_1, 0)$ and $(\theta_1, 0)$. Therefore, the light made incident to the mirror 22 and having the incident angle outside the total reflection boundary line 60 can pass through the plastic film 34, and be reflected by the reflection film 35, but it cannot emerge from the plastic film 34 due to the total reflection at the interface between the plastic film 34 and the layer of air. Therefore, incident light having an incident angle parallel to the optical axes 45 and 46 of the plastic film 34 cannot emerge from the mirror 22. That is, since the uneven pattern 43 appears if the light is incident to the mirror 22 at an incident angle parallel to the optical axes 45 and 46 of the plastic film 34 and emerges from the mirror 22 toward the screen 14, such uneven pattern 43 does not appear if such light does not emerge from the mirror 22.

The condition satisfying that the total reflection boundary line 60 exists inside these points $(-\theta_1, 0)$ and $(\theta_1, 0)$ is that there is the relationship of $\alpha \geq \sin^{-1}(1/n)$, where $\alpha$ is an angle of each of two optical axes 45 and 46 relative to the normal to the mirror 22, and "n" is a refractive index of the plastic sheet.

In order that the total reflection boundary line 60 covers the area as broad as possible, it is preferable that the angle $\theta_1$ formed by the optical axes 45 and 46 of the plastic sheet 34 is as large as possible so that the optical axes 45 and 46 of the plastic sheet 34 approach 90 degrees and becomes generally parallel to the surface of the plastic sheet 34. This can be realized by a plastic film having a biaxial anisotropy such as polyester, by considerably increasing the stretching in one of the directions H and I in FIG. 6. For example, the total reflection boundary line 60 is at 37 degrees when the refractive index is 1.66.

Figure 20:
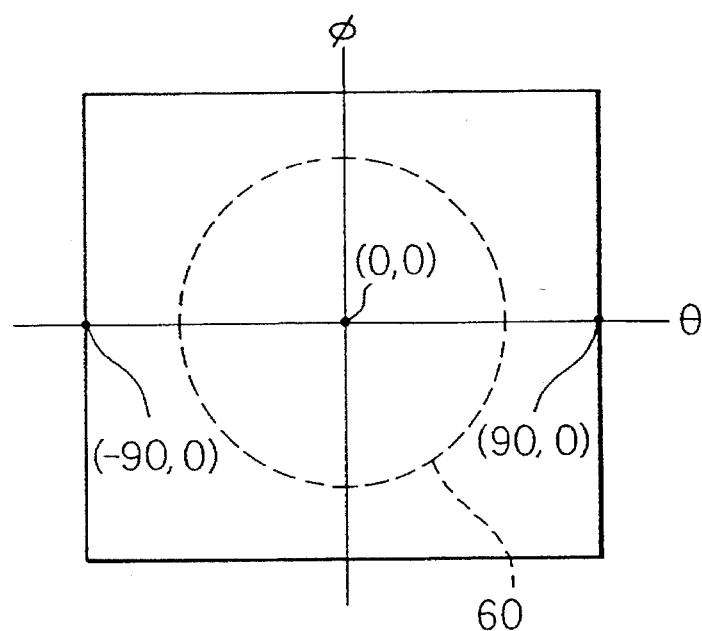
FIG. 20 is a view illustrating the area of the incident light modified from that of FIG. 19.

FIG. 20 is a modification of FIG. 19. In this case, the plastic sheet 34 comprises a polycarbonate film having uniaxial anisotropy, and the optical axes 45 and 46 of the plastic sheet 34 are brought generally parallel to the surface of the plastic sheet 34, by strongly stretching the film in one direction. Therefore, the total reflection boundary line 60 is formed so that the light made incident to the mirror 22 at an incident angle outside the total reflection boundary line 60 and liable to cause the uneven pattern 43 cannot emerge from the plastic sheet 34.

Figure 21:
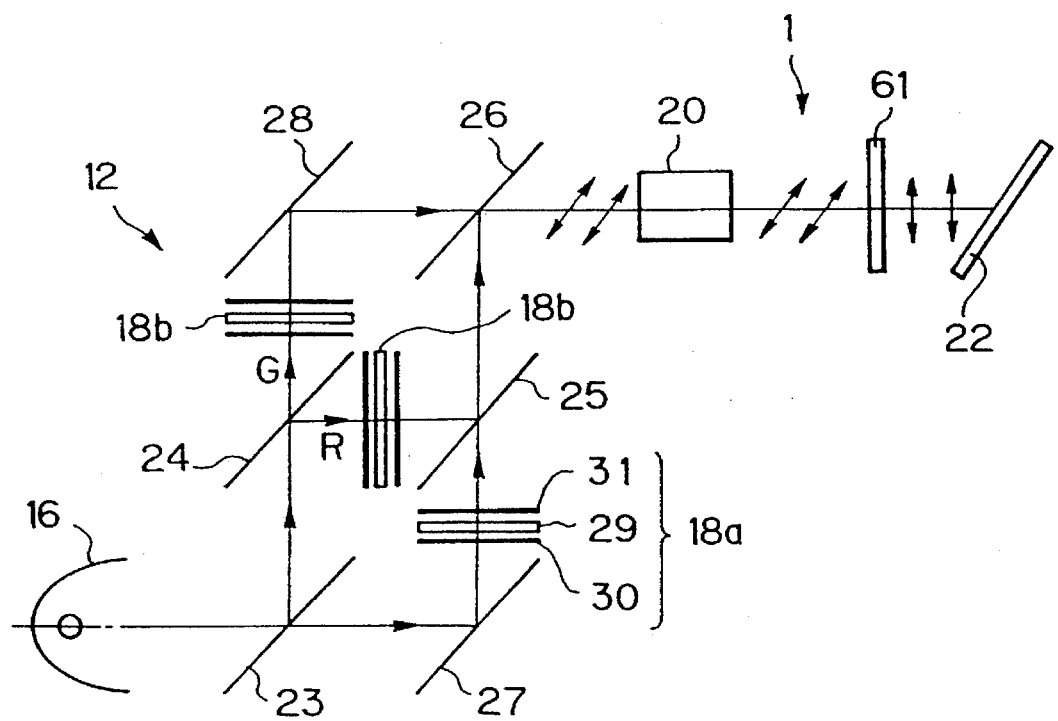
FIG. 21 is a view of the components of the projection unit according to the third embodiment of the present invention.

FIG. 21 shows the third embodiment of the present invention. In FIG. 21, the projection unit 12 of the projector 10 comprises the light source 16, liquid crystal display elements 18a, 18b, and 18c, and the projection lens 20, and the mirror 22 is arranged in the projector casing 11 between the projection lens 20 and the screen 14. Also, there are color separation dichroic mirrors 23 and 24, color combination dichroic mirrors 25 and 26, and total reflection mirrors 27 and 28.

Each liquid crystal display element 18a, 18b, or 18c comprises a liquid crystal panel 29 including a TN-type (twisted nematic type) liquid crystal, the polarizer 30 and the analyzer 31. The polarizer 30 and the analyzer 31 have perpendicular planes. In each liquid crystal display element 18a, 18b, or 18c, the TN-type liquid crystal is held between a pair of transparent glass plates having alignment layers.

Figure 22:
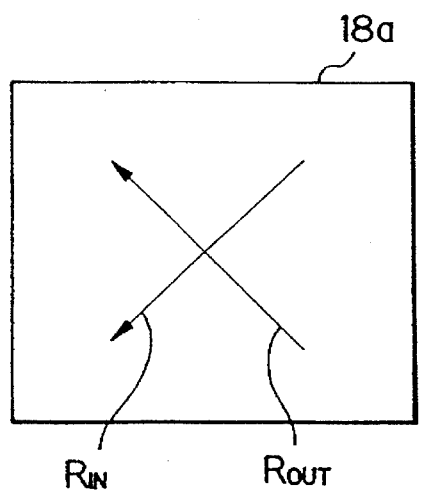
FIG. 22 is a view illustrating the rubbing directions of the liquid crystal display panel.

As shown in FIG. 22, the alignment layer of one of the transparent glass plates to which the light is incident is rubbed in the direction of the arrow $R_{IN}$, and the alignment layer of the other transparent glass plate from which the light emerges is rubbed in the direction of the arrow $R_{OUT}$. These rubbings are carried out at 45 degrees relative to the horizontal of the projector casing 11. The polarizer 30 is arranged to pass therethrough the linear polarized light having a vibrating plane parallel to the arrow $R_{IN}$, and the analyzer 31 is arranged to pass therethrough the linear polarized light having a vibrating plane parallel to the arrow $R_{OUT}$.

It is known that the contrast of the image (the quality of the image) changes depending on the viewing angle at which the screen is viewed. According to the rubbing arrangement of FIG. 22, the viewing angle characteristic when the screen is horizontally viewed from the left is identical to that when viewed from the right, but a viewing angle characteristic when the screen is vertically viewed from above is different from that when viewed from below. For example, regarding the vertical viewing angle characteristic, the brightness of the screen at one point thereon when viewed from above may be 0.5 lux, but the brightness of the screen at that point when viewed from below may be 2 lux.

The rubbing arrangement of FIG. 22 may be preferred since the horizontal viewing angle characteristic is usually important in the display. Since the number of reflections of the light passing through the central liquid crystal display element 18b is different from that of the other elements, the central liquid crystal display element 18b is arranged vertically in reverse relative to the remaining elements 18a and 18c, or the panel is driven so that the image in the central liquid crystal display element 18b is reversed. In any case, the liquid crystal display element 18a, 18b or 18c is arranged in a horizontal position, but the rubbing directions (and the transmitting axes of the polarizer 30 and the analyzer 31) are arranged oblique to the horizontal.

It is usual to arrange the mirror 22 with reference to the horizontal of the projector casing 11 to bend the light vertically or horizontally to satisfy a compact design requirement and easy positioning of the projector unit 12 in the projector casing 11. Therefore, the incident plane to the mirror extends vertically or horizontally, and it is desirable that the polarized light having a vertically or horizontally vibrating plane incident to the mirror 22, as previously described with reference to FIG. 16B and FIG. 16C.

Accordingly, in FIG. 21, a polarized light converting element 61 is arranged between projector lens 20 and the mirror 22 for changing the polarized condition or the polarized direction. In the embodiment, the polarized light converting element 61 comprises a half wave film which causes the vibrating plane of the incident linear polarized light to be rotated 45 degrees. Therefore, the linear polarized light, which emerges from the liquid crystal display elements 18a to 18c and has a vibrating plane at 45 degrees relative to the normal, passes through the projection lens 20 and the polarized light converting element 61, and is converted into a linear polarized light having a vertical or horizontal plane. Thus the linear polarized light having a vertical or horizontal plane is incident to the mirror 22. Note, it is not necessary that the polarized light converting element 61 be arranged between the liquid crystal display elements 18a to 18c and the mirror 22, and it is possible to arrange the polarized light converting element 61 on the upstream side of the projector lens 20.

Second Solution

Figure 23:
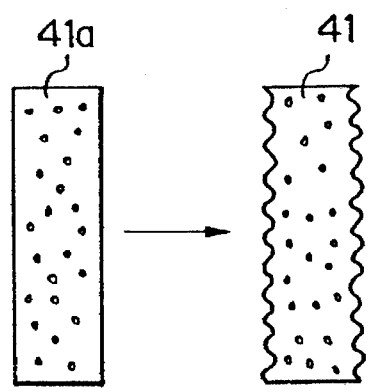
FIG. 23 is a view illustrating the diffusion element of the screen according to the fourth embodiment of the present invention.

FIG. 23 shows the fourth embodiment of the present invention. This embodiment is intended to eliminate the uneven pattern 43 by changing the property of the screen 14. The feature of this embodiment can be applied to the projector 10 of FIGS. 1 and 2.

As described above, the screen 14 of FIG. 14 comprises the combination of a circular fresnel lens 40 and a double sided lenticular lens 41. The double sided lenticular lens 41 is made, by making a simple diffusion plate in which diffusion particles such as small beads are mixed therein and then pressing the simple diffusion plate so that peaks and valleys vertically extend on the surfaces of the plate. The central gain of the simple diffusion plate was approximately 20, and the central gain of the double sided lenticular lens 41 obtained by pressing this simple diffusion plate was approximately 5 (see FIG. 8). In the screen 14 comprising the circular fresnel lens 40 and the double sided lenticular lens 41, there was a substantial difference between the light distribution characteristics for P-polarized light and for S-polarized light. And again, the uneven pattern 43 of FIG. 9 was produced when the polarized light having the distribution of the phase difference of the FIG. 13 was projected onto the screen 14.

The inventors have carried out experiments to determine a condition of the screen 14 by which the uneven pattern 43 of FIG. 9 can be eliminated even if the polarized light having the distribution of the phase difference of the FIG. 13 is projected to the screen 14.

As shown in FIG. 23, a simple diffusion plate 41a is made by mixing beads therein, and the central gain of this simple diffusion plate 41a is less than 10. The double sided lenticular lens 41 is then obtained by pressing this simple diffusion plate 41a, and the screen 14 is made by the combination of the double sided lenticular lens 41 and the fresnel lens 40. The total gain-of the screen 14 is generally lower than 3.

The gain G of the screen 14 is defined by the following relationship of B=GL/π, where B is the intensity of the incident light (candela), and L is the intensity of the transmitted light. It is, of course, possible to make a double sided lenticular lens 41 from the combination of the simple diffusion plate 41a and a separate double sided lenticular lens.

Figure 24:
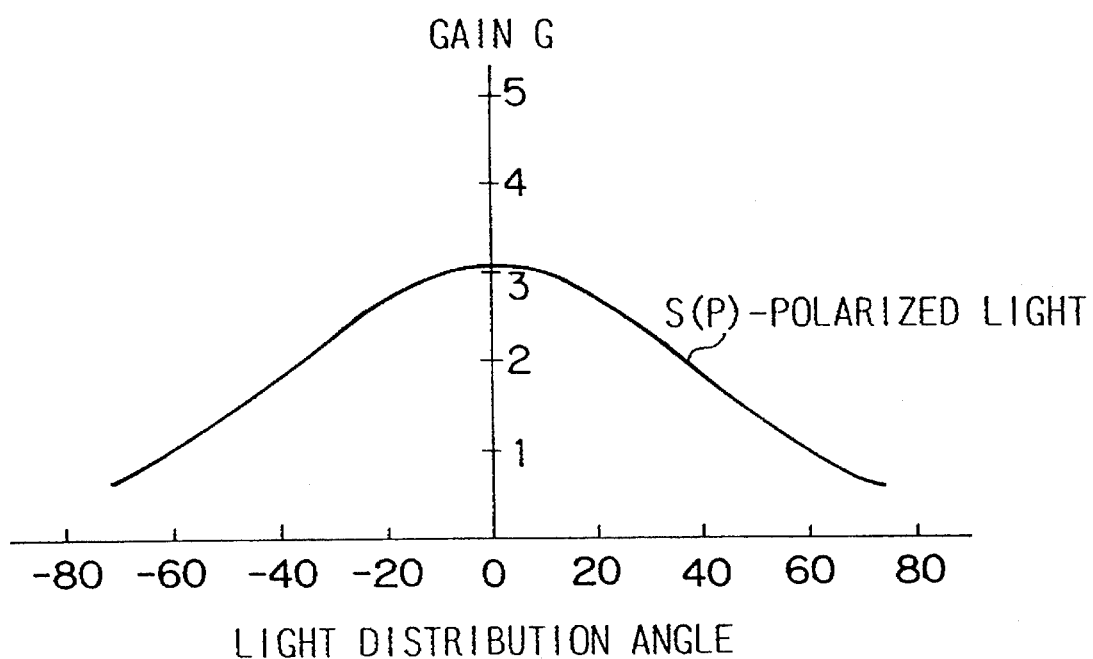
FIG. 24 is a view illustrating the light distribution characteristic of the screen obtained by the diffusion element of FIG. 23.

FIG. 24 shows the light distribution characteristic of this screen 14 including the double sided lenticular lens 41 and the fresnel lens 40. Surprisingly, in this double sided lenticular lens 41, the light distribution characteristic for P-polarized light (having a horizontal plane) is generally identical to the light distribution characteristic for S-polarized light (having a horizontal plane), in the range of a considerably wider distribution angle (viewing angle). The projector 10 is assembled using this screen, and the experiment shows that the uneven pattern 43 of FIG. 9 was not observed, even when the polarized light having the distribution of the phase difference of the FIG. 14 is projected to this screen 14.

Figure 26A:
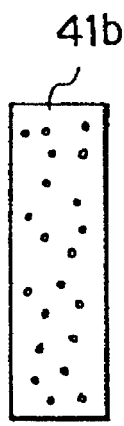
FIG. 26A is a view illustrating the modified diffusion element.
Figure 26B:
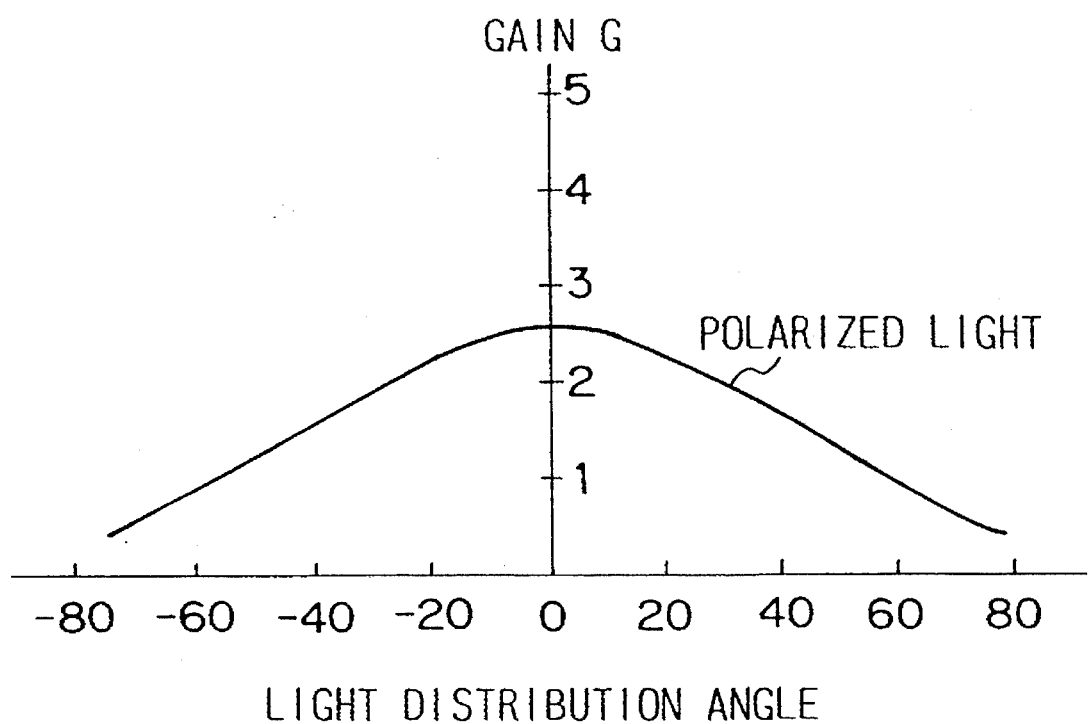
FIG. 26B is a view illustrating the light distribution characteristic of the screen obtained by the diffusion element of FIG. 26A.

FIG. 26A is a modification of FIG. 23, and FIG. 26B shows a view similar to FIG. 24. A simple diffusion plate 41b is made by mixing beads therein, and the central gain of this simple diffusion plate 41b is lower than 6. In this case, this simple diffusion plate 41b is used solely. That is, this simple diffusion plate 41b is not pressed and no double sided lenticular lens is formed on either side thereof, nor is any separate double sided lenticular lens laminated thereon. The screen 14 is made by the combination of the simple diffusion plate 41b and the fresnel lens 40. The total gain of the screen 14 is shown in FIG. 26B. In this case too, the light distribution characteristic for polarized light having a horizontal plane (called herein P-polarized light) is generally identical to the light distribution characteristic for polarized light having a vertical plane (called herein S-polarized light). The projector 10 is assembled using this screen, and the uneven pattern 43 of FIG. 9 was not observed.

In this manner, it can be concluded that if the light distribution characteristic of the screen 14 for P-polarized light is generally identical to the light distribution characteristic of the screen 14 for S-polarized light, the uneven pattern 43 can be eliminated.

Figure 25:
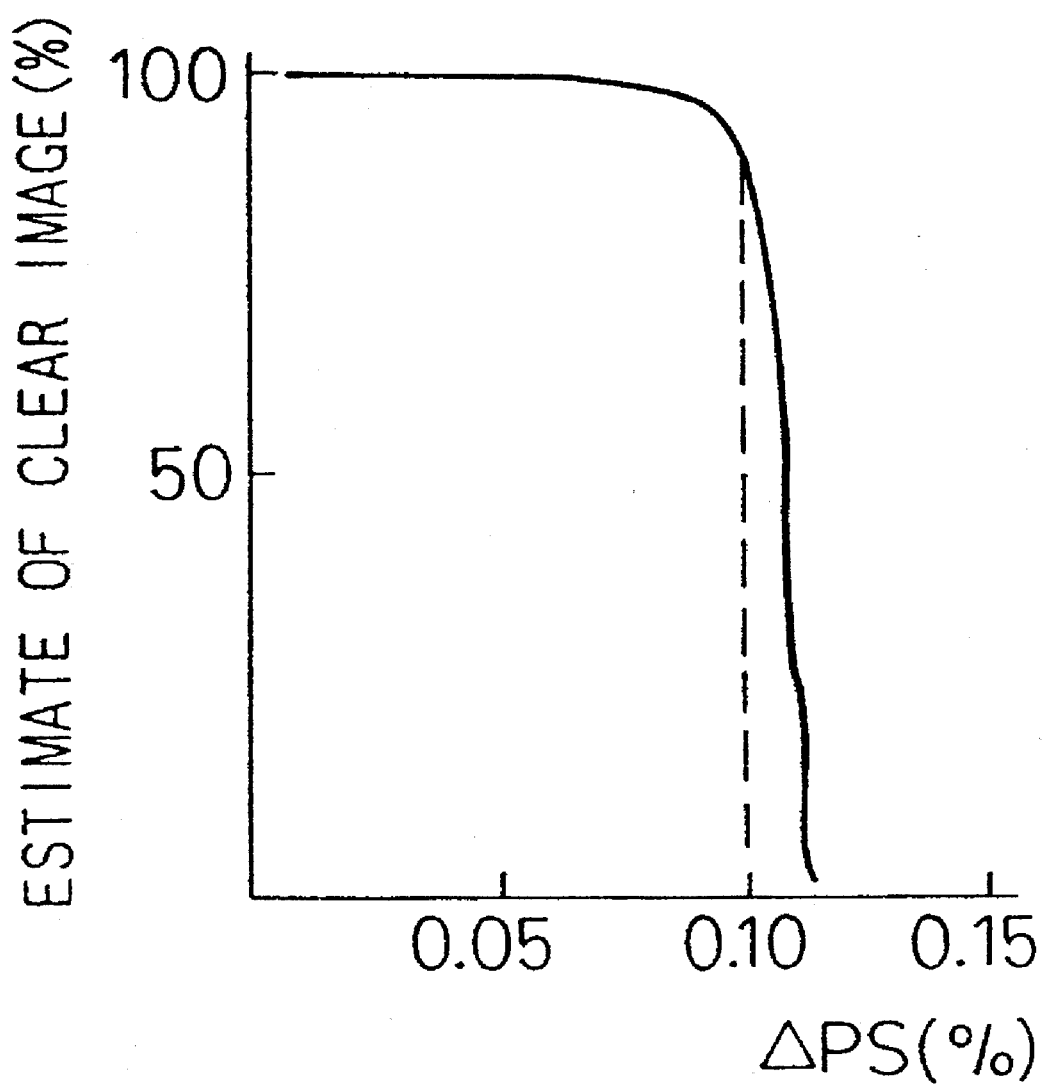
FIG. 25 is a view of the estimate of a clear image versus the difference between the light distribution characteristics of P- and S-polarized lights.

The inventors have manufactured many screens 14 having various light distribution characteristics, and tested the screens to obtain a condition of the screen by which the uneven pattern 43 can be eliminated. FIG. 25 shows the result of the experiments. Twenty four persons estimated clearness of the image in the screen (i.e., absence of the unevenness 43) for each screen 14, while viewing an image. The estimate was given by percentage. The abscissa is ΔPH which is a factor representing a difference between the light distribution characteristics for P-polarized light (having a horizontal plane) and S-polarized light (having a vertical plane) of the screen 14. ΔPH is calculated in the following way. R, G, and B in the following parentheses are representative of red, green and blue components.

A(R), A(G), and A(B) are the amounts of the light projected to the screen as a first polarized light, B(R), B(G), and B(B) are the amounts of the light projected to the screen as a second polarized light perpendicular to the first polarized light, and A(R)≧B(R), A(G)≧B(G), and A(B)≧B(B).

G(R,p), G(G,p), and G(B,p) are the gains of the screen for a third polarized light, G(R,s), G(G,s), and G(B,s) are the gains of the screen for a fourth polarized light perpendicular to the third polarized light, and G(R,p)≧G(R,s), G(G,p)≧G(G,s), and G(B,p)≧G(B,s).

$$\Delta(R)=[A(R)\times G(R,p)+B(R)\times G(R,s)] -[A(R)\times G(R,s)+B(R)\times G(R,p)]$$

$$\Delta(G)=[A(G)\times G(G,p)+B(G)\times G(G,s)] -[A(G)\times G(G,s)+B(G)\times G(G,p)]$$

$$\Delta(B)=[A(B)\times G(B,p)+B(B)\times G(B,S)] -[A(B)\times G(B,s)+B(B)\times G(B,p)]$$

$$\Delta P=|\Delta(R)-\Delta(B)|+|\Delta(G)-\Delta(B)|$$

It will be apparent from FIG. 25 that the relationship of ΔPH<0.1 is preferable to eliminate the unevenness 43.

Figure 27:
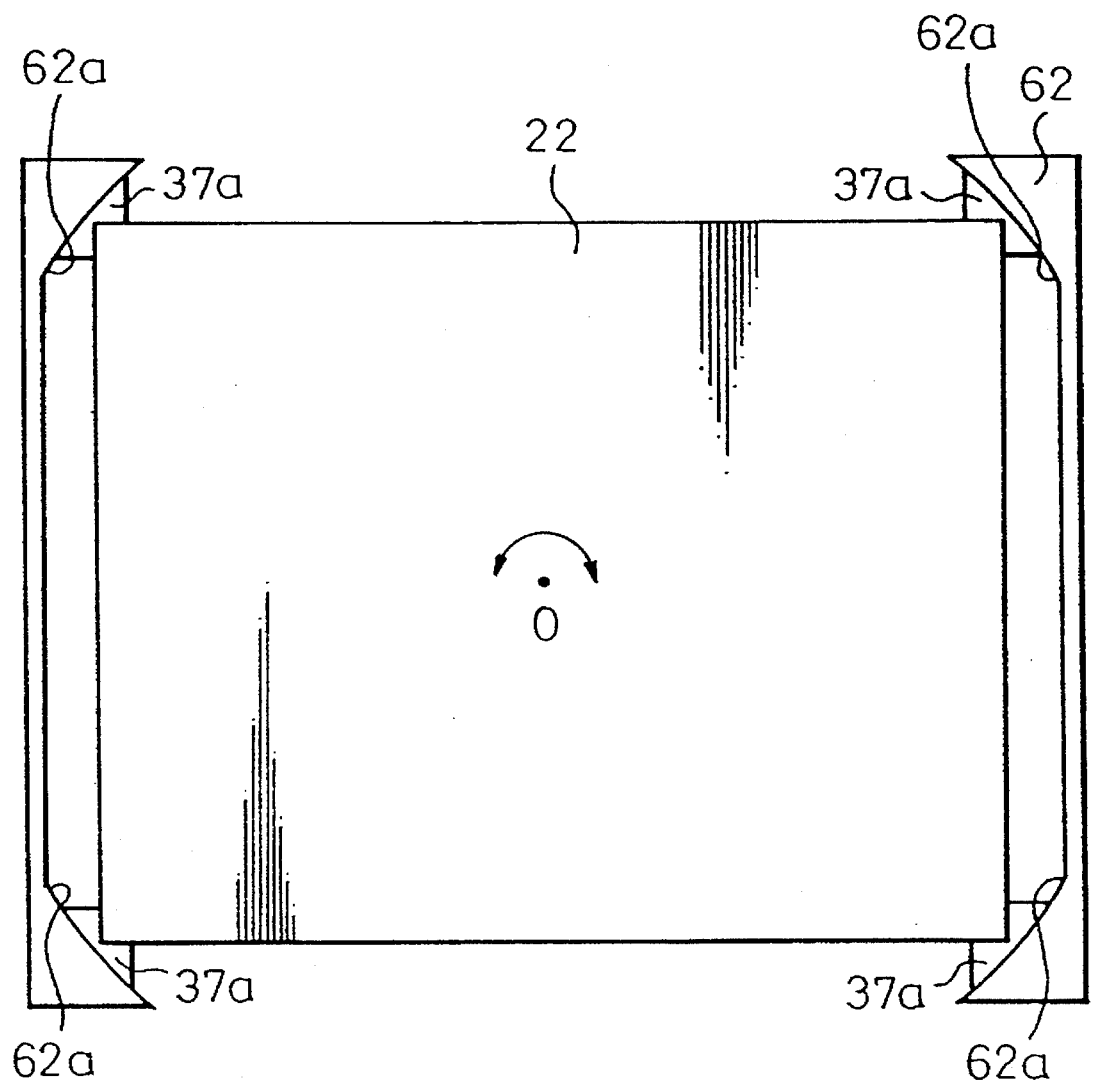
FIG. 27 is a view of the back surface reflection mirror according to the fifth embodiment of the present invention.

FIG. 27 shows the fifth embodiment of the present invention. In this embodiment, the mirror holders 37a are rotatably engaged with frame members 62 constituting a part of the projector casing 11 for rotatably adjusting the position of the mirror 22 about the axis 0 of the mirror 22 parallel to the normal to surface of the back surface mirror 22. The mirror holders 37a support the mirror 22 in a manner as described with reference to FIGS. 3A to 5. The mirror holders 37a have circular arcuate outer surfaces which are engaged with circular arcuate inner surfaces 62a of the frame members 62. Accordingly, the mirror holders 37a can be rotated about the axis 0, and fixed to the frame members 62 by fixing means (not shown) after the position of the mirror 22 is adjusted. In this manner, the relative position of the mirror 22 and the projection lens 20 can be adjusted, in particular, for adjusting the relationship of the optical axes 45 and 46 of the plastic sheet 34 in the mirror 22 relative to the plane of the projected linear polarized light.

Third Solution

Figure 28:
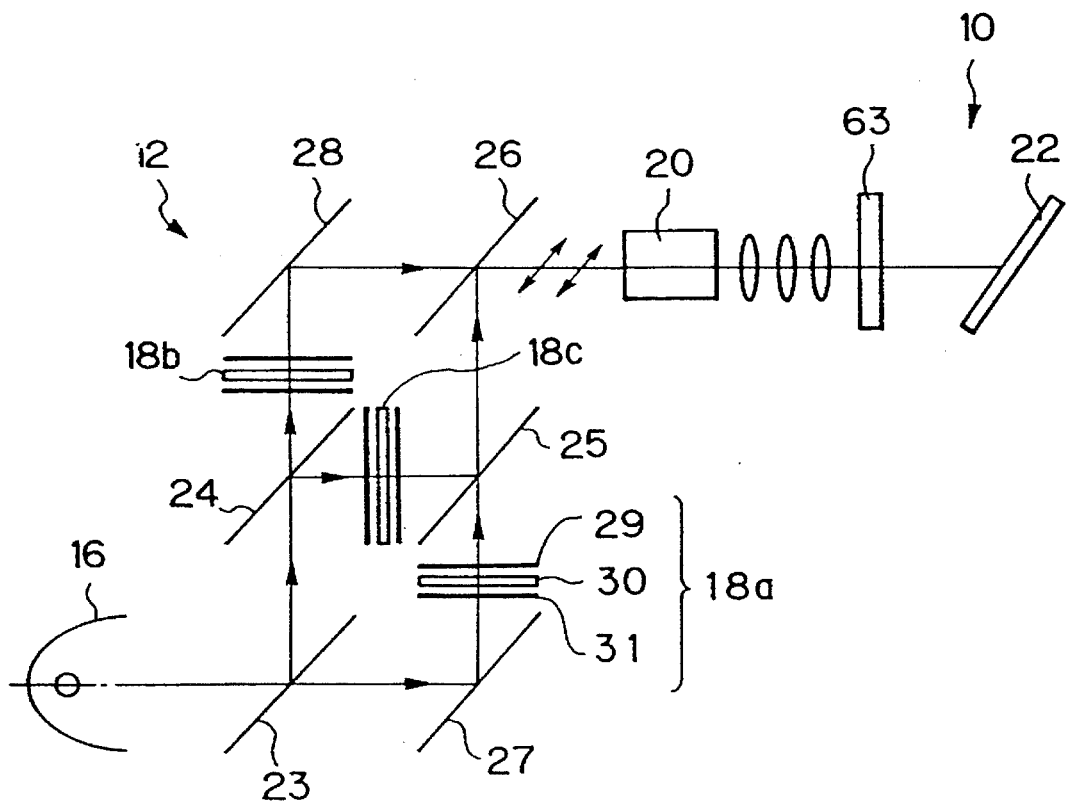
FIG. 28 is a view of the components of the projection unit according to the sixth embodiment of the present invention.

FIG. 28 shows the sixth embodiment of the present invention. The projector 10 in this embodiment comprises the projection lens 20, identical to that in the first embodiment, and the mirror 22, identical to that described with reference to FIGS. 3A to 5, and 11 to 15. In FIG. 28, a polarized light converting element 63 is arranged between the liquid crystal display elements 18a to 18c and the mirror 22, in particular, between the projector lens 20 and the mirror 22, for converting a linear polarized light into a generally non-polarized light.

The inventors have found that the uneven pattern 43 of FIG. 9 does not appear if the light projected by the projection lens 20 and made incident to the plastic sheet 34 having optical anisotropy is a generally non-polarized light in view of phase, even if a phase difference exists in the mirror 22 and the screen 14 has a difference in its light distribution characteristics.

Generally non-polarized light is the sum of polarized light components having various vibrating planes, and it means that the incidence of the generally non-polarized light to the screen 14 corresponds to the incidence of P-polarized light and S-polarized light mixed together at a certain ratio to the screen 14. Therefore, it is the ratio of P-polarized light and S-polarized light in the generally non-polarized light that can be regarded as-a generally non-polarized light. If the generally non-polarized light including a great proportion of P-polarized light component is incident to the screen 14 at a certain point thereof, the brightness of the image at that point will be greater, and if the generally non-polarized light including a great proportion of S-polarized light component is incident to the screen 14 at a certain point thereof, the brightness of the image at that point will be smaller (see FIG. 8). Experiments and search according to the present invention showed that the uneven pattern 43 of FIG. 9 cannot be recognized if the difference between the amounts of the light at that point are within ±10 percent.

This condition can be expressed as follows. The light projected by the projection lens 20 and made incident to the mirror 22 is a generally non-polarized light defined by the relationship of $(A\times P+B\times S)\leq 1.1\times(A\times S+B\times P)$. Here, P and S are gains of the screen 14 in the first and second light distribution characteristics regarding P-polarized light and S-polarized light (see FIG. 8) at a particular distribution angle at which it is desired to obtain a clear image, with P≧S, and A and B are the amounts of the linearly polarized light projected to the screen 14, with A≧B.

For example, when the screen 14 is viewed obliquely and horizontally at the angle of 50 degrees, P=1.5 regarding the polarized light having a horizontally vibrating plane and S=1.3 regarding the polarized light having a vertically vibrating plane. By inserting these values into the above relationship, the relationship of B/A≧0.2 is obtained. Accordingly, it will be appreciated that a linear polarized light should be converted into a generally non-polarized light which satisfies this relationship.

In the sample projector 10, the limit of the horizontal viewing angle at which the image can be recognized is 70 degrees, and the brightness is 30 candela. The gain P of the screen 14 at this point is 0.3, and the gain S is lower than 0.3. Therefore, the result is B/A≧0.85. One example of the polarized light converting element 63 is a roughened polycarbonate plate with polymethyl methacrylate deposited thereon.

Figure 29:
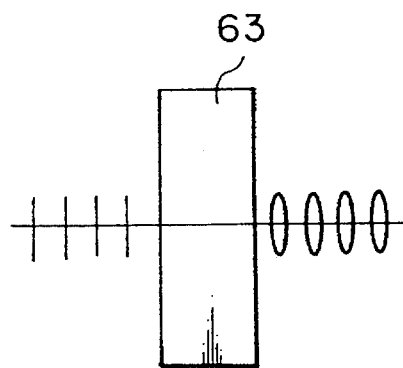
FIG. 29 is a view of an example of the polarized light converting element of FIG. 28.
Figure 30:
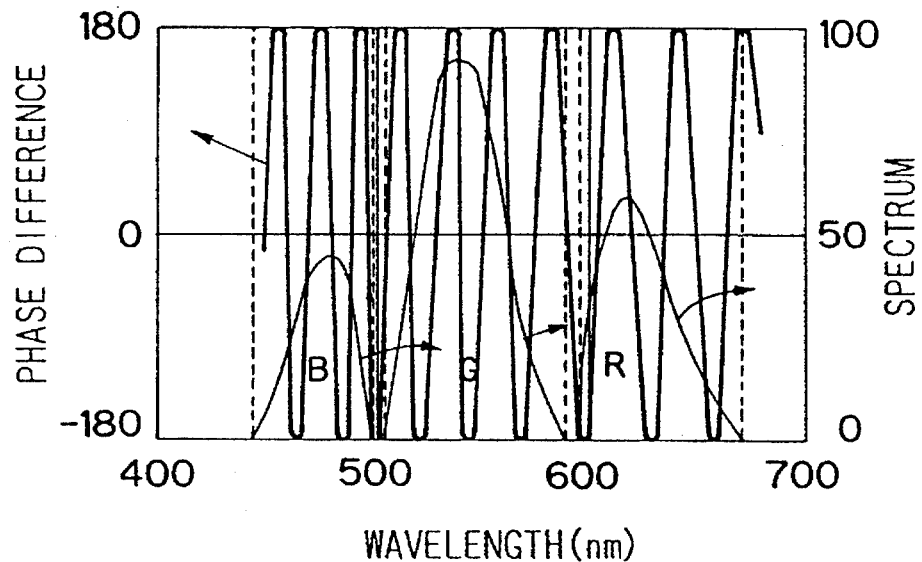
FIG. 30 is a diagram illustrating the phase difference and the spectrum versus the wavelength.

FIG. 29 shows an example of the polarized light converting element 63 comprising a thick phase plate. By setting an appropriate thickness d of the plate and an optical path difference Δnd considerably greater than the wavelength λ, a generally non-polarized light is obtained from the light including the spectrum of red, green and blue bandwidth (FIG. 30), although an elliptical polarized light, a circular polarized light or a linear polarized light is obtained from the light including a single spectrum.

Figure 31:
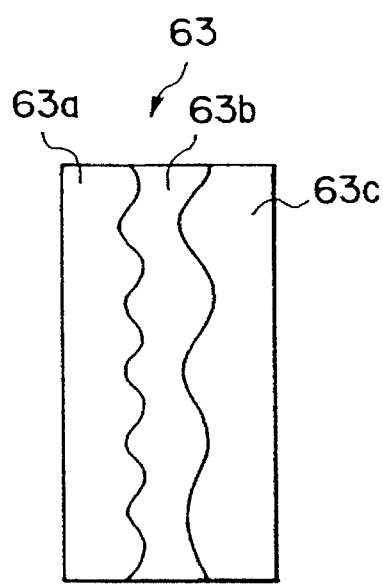
FIG. 31 is a view of another example of the polarized light converting element.
Figure 32:
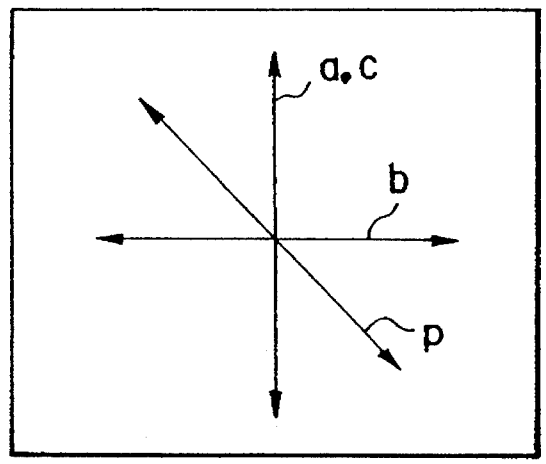
FIG. 32 is a view illustrating the direction of the fast axes of the polarized light converting element of FIG. 31.

FIG. 31 shows another example of the polarized light converting element 63 comprising three phase plates 63a, 63b and 63c. Three phase plates 63a, 63b and 63c are polycarbonate-polymethyl methacrylate-polycarbonate layers and are fused together. The interfaces between the layers are not flat. The fast axes "a", "b" and "c" of three phase plates 63a, 63b and 63c are arranged relative to the vibrating direction of the incident polarized light, as shown in FIG. 32. By this arrangement, a linear polarized light can be converted into a generally non-polarized light.

Figure 33:
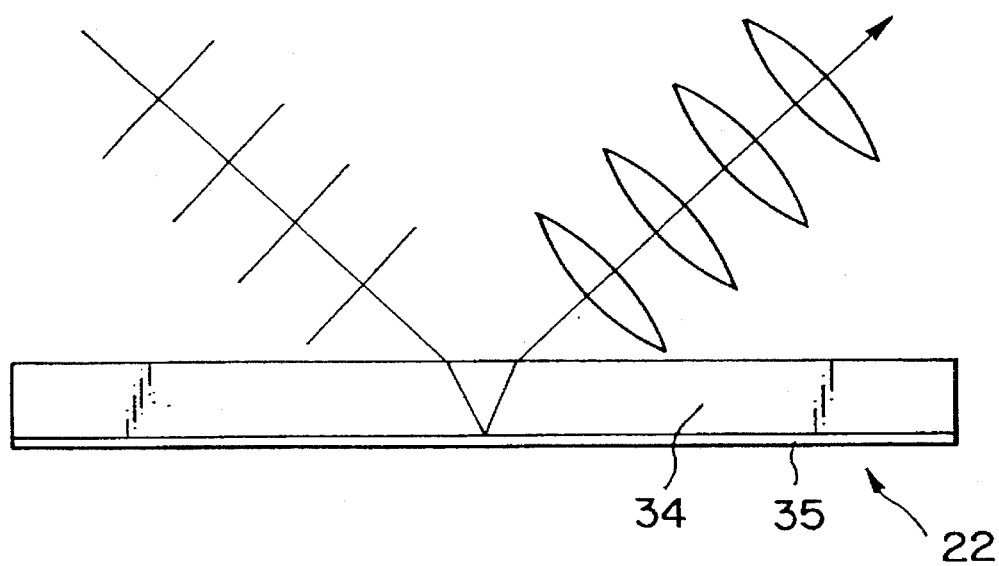
FIG. 33 is a view of still another example of the polarized light converting element of FIG. 28.

FIG. 33 shows that the plastic film 34 in the mirror 22 has an identical thickness to that of the polarized light converting element 63 so that the plastic film 34 also functions as the polarized light converting element 63.

In addition, it is possible to eliminate the uneven pattern 43 without the polarized light converting element 63, by satisfying the following relationship.

$$\left| \frac{2d}{\sqrt{1-\{\sin\theta/n(C1)\}^2}} \times \frac{\Delta n(C1)}{\lambda(C1)} - \frac{2d}{\sqrt{1-\{\sin\theta/n(C2)\}^2}} \times \frac{\Delta n(C2)}{\lambda(C2)} \right| \geq 1$$

where "d" is the thickness of the plastic sheet in the mirror, λ(C1) and λ(C2) are cut-off wavelengths define a bandwidth in each color, Δn(C1) and Δn(C2) are the double refractive indices at the cut-off wavelengths in each color, n(C1) and λ(C2) are the refractive indices at the cut-off wavelengths in each color, and θ is an incident angle to the mirror. C is representative of red, green and blue light, and the above relationship can be obtained for each of red, green and blue light.

That is, the light may be extremely polarized in a particular direction in a single wavelength, but it is possible to consider that many colors are included in the respective bandwidth of red, green and blue lights and respective bandwidth has polarized light components with generally all different phases, so the light in each bandwidth is a generally non-polarized light. Therefore, even if the state of polarization changes when the light passes through the plastic sheet 34 in the mirror 22, the reflected light in each bandwidth is also a generally non-polarized light.

In more detail, in each bandwidth, the chromaticity and the amount of a polarized light having a plane are made generally identical to those of a polarized light having a plane perpendicular to the former plane. By this feature, the generally identical relationship of the chromaticity and the amount between the perpendicular polarized lights is maintained after the light is reflected by the mirror 22, and the uneven pattern 43 does not appear even if the screen 14 has a different light distribution characteristics.

When the light having the wavelength λ(C1) passes through the plastic sheet 34 having the thickness "d", a phase difference "D" occurs due to the double refractive index Δn(C1).

$$D = \frac{2d}{\sqrt{1-\{\sin\theta/n(C1)\}^2}} \times \frac{\Delta n(C1)}{\lambda(C1)}$$

Here, the first portion is the optical path length in the plastic film 34 when the light is obliquely incident.

The phase difference "D" may change depending on the wavelength, but is deemed that the chromaticity and the amount of the perpendicular polarized light components are generally identical to each other if the difference between λ(C1) and λ(C2) in the cut-off wavelength is generally greater than one wavelength. Therefore, it is possible to eliminate the uneven pattern 43, by satisfying the above relationship.

For example, regarding the green light, the projector 10 presenting the uneven pattern 43 showed the following values: d=28 μm, λ(G1)=0.52 μm, λ(G2)= 0.57 μm, n(G1)= 1.66, n(G2)=1.65, and Δn(G1)=Δn(G2)= 0.005. The phase difference "D" at the incident angle θ=2 is (0.04×2π), which is smaller than 2π. According to this embodiment, it is possible to eliminate or considerably mitigate the uneven pattern 43 by selecting d=600 μm and the phase difference "D"= (1.04×2π).

Figure 34:
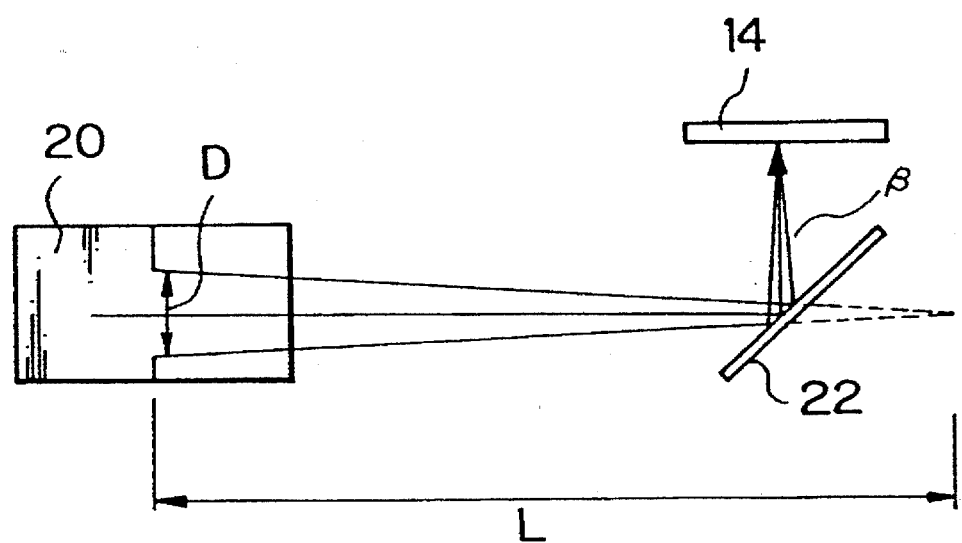
FIG. 34 is a view of the projection lens and the back surface reflecting mirror according to the seventh embodiment of the present invention.

FIG. 34 shows the seventh embodiment of the present invention. This embodiment is based on the fact that a phase difference occurs due to a dispersion of the light having the incident angle to the mirror 22 since the exit pupil of the projection lens 20 has a definite size. That is, the light projected by the projection lens 20 and substantially convergent at one point on the screen 14 has an angular dispersion. This embodiment is directed to eliminating the uneven pattern 43 by providing the feature that the phase difference of the light occurring when the light passes through the plastic sheet 34 is generally greater than one wavelength of the light.

Figure 35:
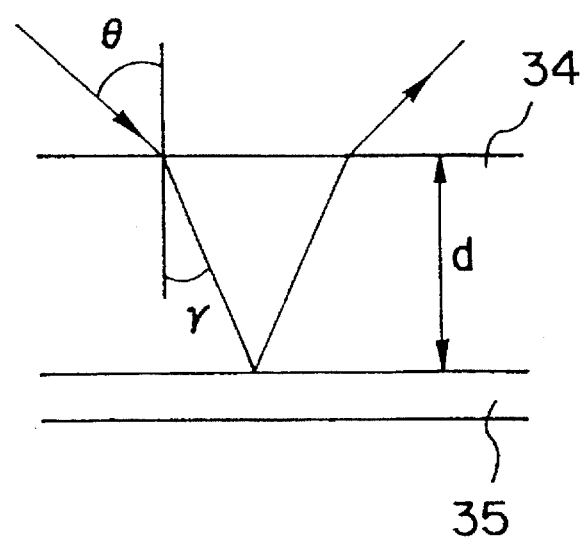
FIG. 35 is a view illustrating the manner of the incident and emerging light.

For example, as shown in FIGS. 34 and 35, the following symbols are used: the incident angle θ to the plastic sheet 34, the refractive angle γ from the plastic sheet 34, the refractive index n(λ) of the plastic sheet 34, the double refractive index Δn(λ) of the plastic sheet 34, the diameter Dp of the exit pupil of the projector lens 20, one half β of the convergent angle at the screen 14, the distance L between the projection lens 20 and the focus plane, and the thickness d of the plastic sheet 34.

Regarding one half β of the convergent angle, there is the relationship tan θ=(Dp/2)/L. The dispersion of the incident angle to the plastic sheet 34 is (θ+β)~ (θ−β). If S is (the optical path length of the plastic sheet 34/ the refractive angle γ), $$S = 2d/\cos\gamma$$

$$= 2d/\sqrt{1-\{\sin\theta/n(\lambda)\}^2}$$

$$= 2dn(\lambda)/\sqrt{n(\lambda)^2 - (\sin^2\theta)}$$

When the incident angle is (θ+β), $$S_1 = 2dn(\lambda)/\sqrt{n(\lambda)^2 - (\sin^2\theta + \beta)}$$

When the incident angle is (θ−β), $$S_2 = 2dn(\lambda)/\sqrt{n(\lambda)^2 - (\sin^2\theta - \beta)}$$

The maximum difference of the optical path lengths is $(S_1-S_2)$, and the maximum phase difference of the convergent light is $\Delta n(\lambda)(S_1-S_2)/\lambda$.

Therefore, the condition that causes the phase difference of the light, occurring when the light passes through the plastic sheet 34, to be generally greater than one wavelength of the light, is the relationship of $\Delta n(\lambda)(S_1-S_2)/\lambda \geq 1$.

For example, when Dp=20 mm, L=1500 mm, λ=0.053 μm, n=1.66, θ=40°, and Δn=0.08, d=1 mm.

It is possible to use the features of the sixth embodiment and the seventh embodiment in combination.

Figure 36:
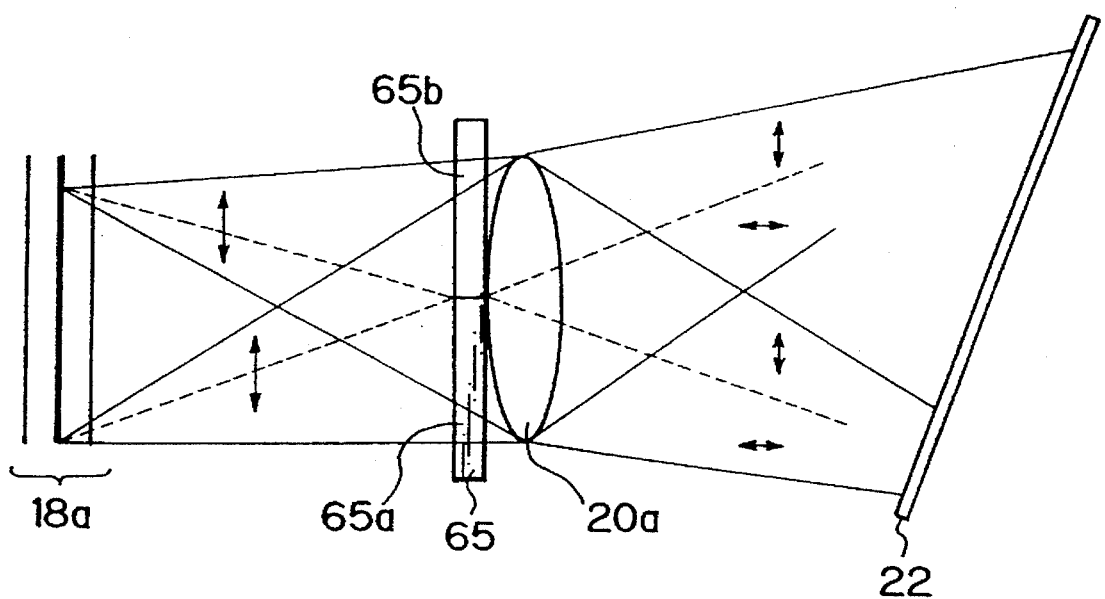
FIG. 36 is a view of the projection lens and the back surface reflecting mirror according to the eighth embodiment of the present invention.

FIG. 36 shows the eighth embodiment of the present invention. The projector 10 of this embodiment comprises the light source 16, the liquid crystal display elements 18a to 18c, the projection lens 20 (represented by a lens member 20a), the mirror 22 including the plastic sheet 34 and the reflection film 35, and the screen 14 (refer to FIGS. 1 and 2 regarding the elements not shown in FIG. 36). The light is modulated by the liquid crystal display element 18a, 18b or 18c and diverges from pixels thereof toward the projection lens 20 and the mirror 22. The light diverging substantially from one point of the liquid crystal display elements 18a to 18c is in a generally regularly polarized state with respect to the diverging angle.

A polarized light converting element 65 is provided between the liquid crystal display elements 18a to 18c and the mirror 22. In the embodiment, the polarized light converting element 65 is provided between the liquid crystal display elements 18a to 18c and the projector lens 20. The polarized light converting element 65 has a similar function to that of the polarized light converting element 63 in FIG. 28. The polarized light converting element 65 converts light in a generally regularly polarized state with respect to the diverging angle into light in an irregularly polarized state with respect to the diverging angle.

The polarized light converting element 65 in FIG. 36 is divided into a plurality of (two in FIG. 36) regions 65a and 65b, each of the regions having a different polarized light converting function. For example, the divided polarized light converting regions 65a and 65b comprise linear phase films having different optical lengths or rotary polarizing films having different optical activities.

Figure 37A:
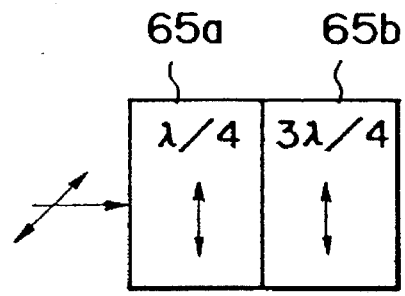
FIGS. 37A and 37B are views illustrating an example of the divided regions of the polarized light converting element.
Figure 37B:
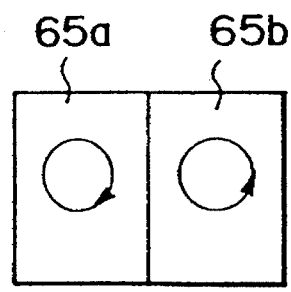

FIGS. 37A and 37B show an example of the divided regions 65a and 65b of the polarized light converting element 65. The region 65a comprises a ¼ wave film having a slow axis (or a fast axis) extending in a certain direction, so that it converts the linear polarized light having a vibrating plane extending at 45 degrees into a clockwise (or anticlockwise) rotating circular polarized light, as shown in FIG. 37B. The other region 65b comprises a ¾ wave film having a slow axis (or a fast axis) extending in the same manner as the former, so that it converts the linear polarized light having a plane extending at 45 degrees into a anticlockwise (or clockwise) rotating circular polarized light, as shown in FIG. 37B. The thickness and the refractive index of the regions 65a and 65b are controlled so that the phase difference between the regions 65a and 65b for the light having the constant wavelength is one half of the wavelength.

The polarized light converting element 65 is arranged close to the projection lens 20 so as to function equally regarding the modulated light emerging from the respective pixels of the liquid crystal display elements 18a, 18b and 18c. This arrangement also has an advantage that an interface between the regions 65a and 65b comprising organic films does not cause an undesirable image.

Figure 38A:
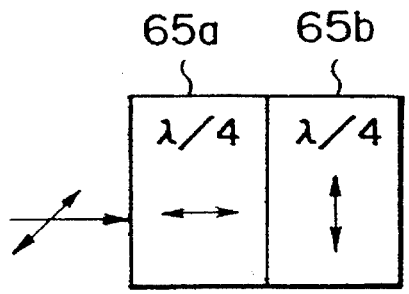
FIG. 38A and 38B are views illustrating another example of the divided regions of the polarized light converting element.
Figure 38B:
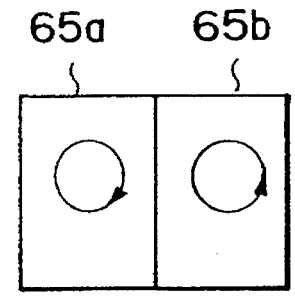

FIGS. 38A and 38B show another example of the divided regions 65a and 65b of the polarized light converting element 65. The region 65a comprises a ¼ wave film having a slow axis (or a fast axis) extending in a certain direction, so that it converts the linear polarized light into a clockwise (or anticlockwise) rotating circular polarized light. The other region 65b comprises a ¼ wave film having a slow axis (or a fast axis) extending perpendicular to the former, so that it converts the linear polarized light into a anticlockwise (or clockwise) rotating circular polarized light.

Figure 39A:
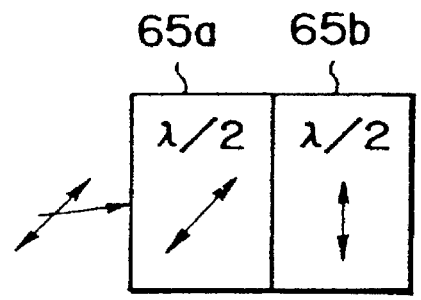
FIG. 39A and 39B are views illustrating still another example of the divided regions of the polarized light converting element.
Figure 39B:
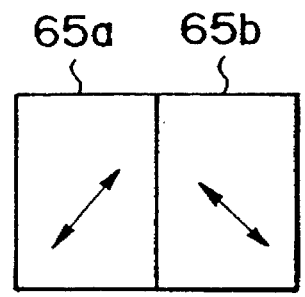

FIGS. 39A and 39B show still another example of the divided regions 65a and 65b of the polarized light converting element 65. The region 65a comprises a half wave film having a slow axis (or a fast axis) extending in a certain direction, so that it converts the linear polarized light into a linear polarized light having the same plane as that when it is incident, as shown in FIG. 39B. The other region 65b comprises a half wave film having a slow axis (or a fast axis) extending at 45 degrees relative to that when it is incident, so that it converts the linear polarized light into a linear polarized light having the plane rotated 90 degrees from the initial state. In this embodiment, the region 65a is arranged so that the slow axis thereof coincides with the vibrating plane of the incident light, but the vibrating planes of the linear polarized lights from the regions 65a and 65b are perpendicular to each other if the vibrating direction of the incident light is changed.

Figure 40A:
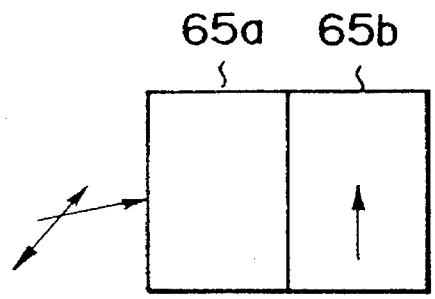
FIG. 40A and 40B are views illustrating still another example of the divided regions of the polarized light converting element.
Figure 40B:
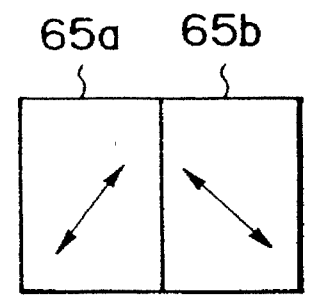

FIGS. 40A and 40B show still another example of the divided regions 65a and 65b of the polarized light converting element 65. The region 65a is an optical path length correction plate comprising a glass plate having a certain thickness, which converts the linear polarized light into a linear polarized light having the same plane as that when it is incident, as shown in FIG. 40B. The other region 65b comprises a half wave film having a slow axis (or a fast axis) extending in a predetermined direction, so that it converts the linear polarized light into a linear polarized light having its plane rotated 90 degrees from the initial state, as shown in FIG. 40B. Therefore, the vibrating planes of the linear polarized lights emerging from the regions 65a and 65b are perpendicular to each other, and the optical path length correction plate in the region 65a corrects the optical path length corresponding to the plate of the region 65a.

Figure 41A:
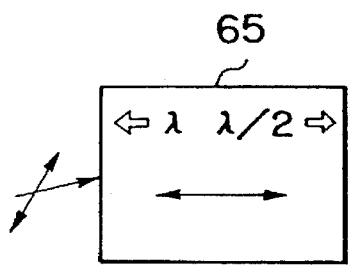
FIG. 41A to 41C are views illustrating another example of the polarized light converting element.
Figure 41B:
Figure 41C:
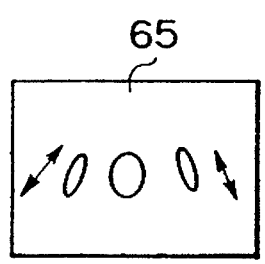

FIGS. 41A to 41C show another example of the polarized light converting element 65. FIG. 41A is a plan view of the element 65, FIG. 41B is a side view of the element 65, and FIG. 41C illustrates the operation of the element 65. The polarized light converting element 65 has a tapered thickness, as shown in FIG. 41B, so that it functions as a full wave film at one end of the element 65 and as a half wave film at the other end of the element 65 and the characteristic continuously changes from one end to the other end, as shown in FIG. 41A. Therefore, the light emerging from the element 65 becomes a linear polarized light, an elliptical polarized light or a circular polarized light depending on the position in the element 65, as shown in FIG. 41C. The polarized light converting element 65 is of a distribution type linear phase plate in which a polarized light converting function changes spatially continuously.

Figure 42A:
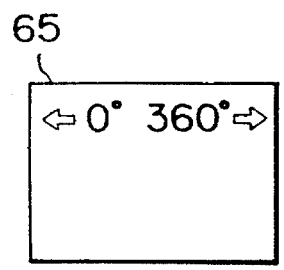
FIG. 42A to 42C are views illustrating still another example of the polarized light converting element.
Figure 42B:
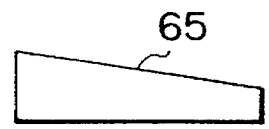
Figure 42C:
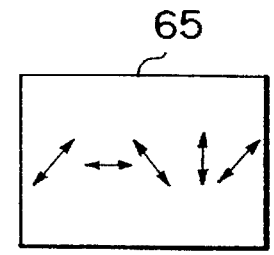

FIGS. 42A to 42C show the other example of the polarized light converting element 65. FIG. 42A is a plan view of the element 65, FIG. 42B is a side view of the element 65, and FIG. 42C illustrates the operation the element 65. The polarized light converting element 65 is a distribution type rotary polarizing plate in which an optical activity changes spatially continuously. The plate comprises a magnetic garnet or a liquid crystal polymer and has a tapered thickness, as shown in FIG. 42B, so that it functions to rotate the phase of the emerging light to zero at one end thereof and to 360 degrees at the other end thereof and the characteristic continuously changes from one end to the other end, as shown in FIG. 42A. Therefore, the light emerging from the element 65 becomes a linear polarized light having a vibrating plane which changes depending on its position in the element 65, as shown in FIG. 42C. The arrangements of FIGS. 41A and 42C have no interface which might exist in the divided polarized light converting element 65, and thus the projected light is not dispersed. To compensate for the optical path length of the element 65 having a thickness which changes in a taper, it is possible to use an optical path length correction plate (refer to FIG. 40, for example).

Figure 43:
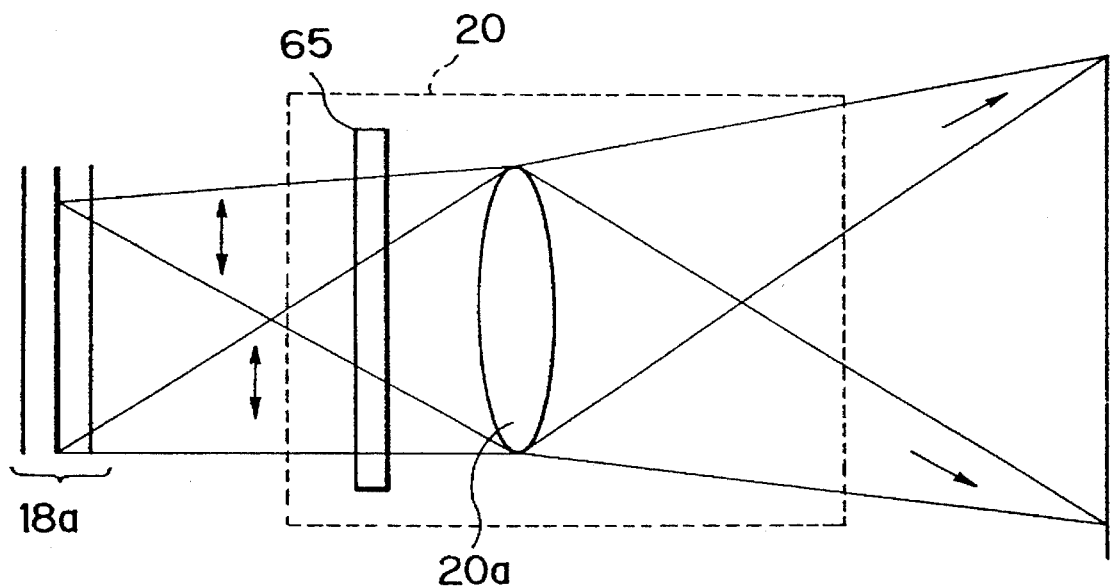
FIG. 43 is a view of the projection lens and the back surface reflecting mirror according to the tenth embodiment of the present invention.
Figure 44:
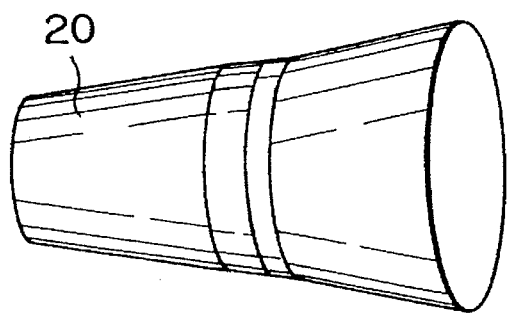
FIG. 44 is a perspective view of the projection lens of FIG. 43.
Figure 45:
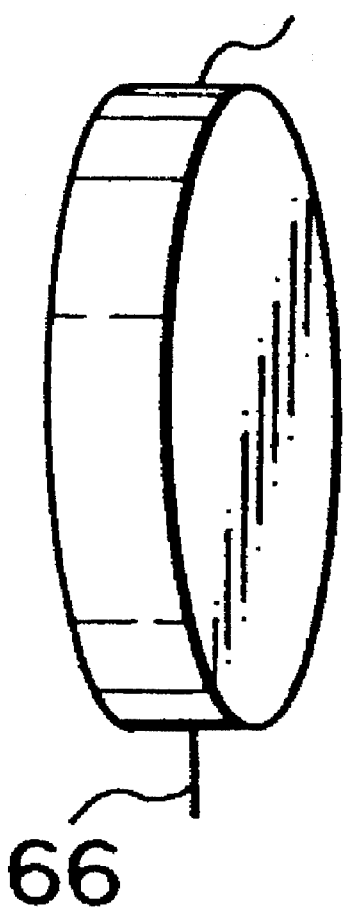
FIG. 45 is a view of the holder of the polarized light converting element of FIG. 43.

FIGS. 43 to 45 show the ninth embodiment of the present invention, generally similar to FIG. 36. The projector 10 of this embodiment comprises the light source 16, the liquid crystal display elements 18a to 18c, the projection lens 20, the mirror 22 including the plastic sheet 34 and the reflection film 35, and the screen 14 (refer to FIGS. 1 and 2 regarding the elements not shown in FIG. 43). The polarized light converting element 65 is provided between the liquid crystal display elements 18a to 18c and the projector lens 20. The polarized light converting element 65 is preferably incorporated in the projection lens 20 at a position of the exit pupil. In particular, the polarized light converting element 65 is attached to a holder 65c of FIG. 45 which can be incorporated in the projection lens 20 by a screw fitting. The holder 65c has a stop screw 66 by which the holder 65c with the element 65 can be fixed to the projection lens 20 after the element 65 is adjusted relative to the projection lens 20 so that the element 65 is brought into an adequate position relative to the mirror 22.

As described in greater detail, according to the present invention, it is possible to obtain a larger and lighter projector in which an unevenness in the image can be eliminated.

We claim:

1. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected from the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon; and wherein the projection lens and the back surface reflection mirror are arranged in such a relationship that an arbitrary light component of the light projected by the projection lens and made incident to the back surface reflection mirror is not parallel to the at least one optical axis of the plastic sheet.

2. A projector according to claim 1, further comprising means for causing the light from said light source to be polarized so that the light projected by the projection lens and made incident to the back surface reflection mirror mainly includes linearly polarized light; and wherein said screen has a first light distribution characteristic for vertical polarized light and a second light distribution characteristic for a horizontal polarized light, the first light distribution characteristic differing from the second light distribution characteristic.

3. A projector according to claim 1, wherein the transparent plastic sheet has two optical axes and an optical axis plane including said two optical axes, and the projection lens has an optical axis, said optical axis plane being generally perpendicular to the back surface reflection mirror, an incident plane of the light passing through the optical axis of the projection lens to the mirror being generally perpendicular to the optical axis plane; and wherein the light passing through the optical axis of the projection lens is made incident to the back surface reflection mirror substantially as P-polarized light or S-polarized light.

4. A projector according to claim 3, wherein the transparent plastic sheet comprises a polyester film having biaxial anisotropy.

5. A projector according to claim 1, wherein the at least one optical axis of the transparent plastic sheet is generally parallel to the surface of the transparent plastic sheet.

6. A projector according to claim 1, wherein the transparent plastic sheet comprises a polycarbonate film having uniaxial anisotropy.

7. A projector according to claim 1, wherein the transparent plastic sheet has an optical axis, and there is the relationship of $$\alpha \geq \sin^{-1}(1/n)$$

where $\alpha$ is an angle of the optical axis relative to the normal to the back surface reflection mirror, and "n" is a refractive index of the transparent plastic sheet.

8. A projector according to claim 7, wherein the transparent plastic sheet comprises a polyester film having biaxial anisotropy.

9. A projector according to claim 1, further comprising a polarized light converting element arranged between the at least one space modulation element and the back surface reflection mirror for changing a state of polarization.

10. A projector according to claim 1, wherein the at least one space modulation element comprises a polarizer, a TN-type liquid crystal panel, and an analyzer.

11. A projector according to claim 1, further comprising means for rotatably adjusting the position of said back surface reflection mirror about an axis parallel to the normal to said back surface reflection mirror.

12. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected by the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon; and wherein there is the relationship of $$\Delta PH < 0.1$$

where R, G, and B in the following parentheses are representative of red, green and blue components, A(R), A(G), and A(B) are the amounts of the light projected onto the screen as a first polarized light, B(R), B(G), and B(B) are the amounts of the light projected to the screen as a second polarized light perpendicular to the first polarized light, $A(R) \geq B(R)$, $A(G) \geq B(G)$, and $A(B) \geq B(B)$, G(R,p), G(G,p), and G(B,p) are the gains of the screen for a third polarized light, G(R,s), G(G,s), and G(B,s) are the gains of the screen for a fourth polarized light perpendicular to the third polarized light, $G(R,p) \geq G(R,s)$, $G(G,p) \geq G(G,s)$, and $G(B,p) \geq G(B,s)$, and $$\Delta(R) = [A(R) \times G(R,p) + B(R) \times G(R,s)] - [A(R) \times G(R,s) + B(R) \times G(R,p)]$$

$$\Delta(G) = [A(G) \times G(G,p) + B(G) \times G(G,s)] - [A(G) \times G(G,s) + B(G) \times G(G,p)]$$

$$\Delta(B)=[A(B)\times G(B,p)+B(B)\times G(B,s)] -[A(B)\times G(B,s)+B(B)\times G(B,p)]$$

$$\Delta PH=|\Delta(R)-\Delta(B)|+|\Delta(G)-\Delta(B)|.$$

13. A projector according to claim 12, wherein said screen comprises a fresnel lens and means for distributing the light in the horizontal direction.

14. A projector according to claim 13, wherein said means for distributing the light in the horizontal direction includes a simple diffusion element having a central gain smaller than 10 and an additional diffusion element having at least one uneven surface to provide directional diffusion.

15. A projector according to claim 13, wherein said means for distributing the light in the horizontal direction includes a simple diffusion plate having a central gain smaller than 6.

16. A projector according to claim 12, wherein said at least one space modulation element comprises a polarizer, a TN-type liquid crystal panel, and an analyzer.

17. A projector according to claim 12, further comprising means for rotatably adjusting the position of said back surface reflection mirror about an axis parallel to the normal to said back surface reflection mirror.

18. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected by the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon, said screen having a first light distribution characteristic for vertical linearly polarized light and a second light distribution characteristic for horizontal linearly polarized light, the first light distribution characteristic differing from the second light distribution characteristic; and wherein the light projected by the projection lens and made incident to the back surface reflection mirror is a generally non-polarized light defined by the relationship of $$\frac{A\times P+B\times S}{A\times S+B\times P} \leq 1.1$$

where P and S are gains of the screen in the first and second light distribution characteristics at a particular distribution angle at which it is desired to obtain a clear image, with $P \geq S$, and A and B are the amounts of the linearly polarized light components projected to the screen, with $A \geq B$.

19. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected by the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon; and wherein there is the relationship of $$\left| \frac{2d}{\sqrt{1-\{\sin\theta/n(C1)\}^2}} \times \frac{\Delta n(C1)}{\lambda(C1)} - \frac{2d}{\sqrt{1-\{\sin\theta/n(C2)\}^2}} \times \frac{\Delta n(C2)}{\lambda(C2)} \right| \geq 1$$

where "d" is the thickness of the plastic sheet in the mirror, $\lambda(C1)$ and $\lambda(C2)$ are cut-off wavelengths defining a bandwidth in each color, $\Delta n(C1)$ and $\Delta n(C2)$ are the double refractive indices at the cut-off wavelengths in each color, $n(C1)$ and $n(C2)$ are the refractive indices at the cut wavelengths in each color, and $\theta$ is an incident angle to the mirror.

20. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected by the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon; and wherein the light projected by the projection lens and substantially converging at one point on the screen has an angular dispersion and the phase difference of the light which passes through the transparent plastic sheet is generally greater than one wavelength of the light.

21. A projector comprising:

a light source;

at least one space modulation element arranged to receive the light from said light source for producing a modulated light;

at least one projection lens arranged to receive the modulated light for projecting the latter;

a back surface reflection mirror including a transparent plastic sheet and a reflecting film superposed on the plastic sheet so that the light projected by the projection lens is made incident to the plastic sheet and reflected by the reflecting film, the transparent plastic sheet having optical anisotropy and at least one optical axis;

a screen arranged to receive the light reflected by the back surface reflection mirror for producing an image thereon; and wherein the modulated light diverging from substantially one point on the at least one space modulation element is in a generally regularly polarized state with respect to the diverging angle, and a polarized light converting element is provided for converting a generally regularly polarized light with respect to the diverging angle into an irregularly polarized light with respect to the diverging angle.

22. A projector according to claim 21, wherein said polarized light converting element is divided into a plurality of regions, each of the regions having a different polarized light converting function.

23. A projector according to claim 22, wherein said polarized light converting element comprises one of (a) linear phase plates having different optical lengths for the respective regions and (b) rotary polarizing plates having different optical activities for the respective regions.

24. A projector according to claim 22, wherein said polarized light converting element comprises linear phase plates having different slow axes for the respective regions.

25. A projector according to claim 22, wherein said divided regions are arranged so that the light emerges from the respective regions in the form of one pair of (a) linear polarized light beams having planes perpendicular to each other, (b) right and left circular polarized light beams, and (c) elliptical polarized light beams having perpendicular long axes.

26. A projector according to claim 25, wherein the light made incident to the polarized light converting element is mainly a linearly polarized light, and one of the two divided regions is a half-wave plate having a fast axis at approximately 45 degrees relative to the vibrating plane of the incident light.

27. A projector according to claim 22, wherein one of the divided regions has a linear birefringence or a circular birefringence and the other region has isotropy.

28. A projector according to claim 22, wherein said polarized light converting element is of a distributed type in which a polarized light converting function changes spatially continuously.

29. A projector according to claim 22, wherein said polarized light converting element comprises a distributed type linear phase plate in which an optical length changes spatially continuously and a distributed type rotary polarizing plate in which optical activity changes spatially continuously.

30. A projector according to claim 21, wherein said polarized light converting element is arranged in or near the projection lens.

31. A projector according to claim 30, wherein said polarized light converting element is incorporated in the projection lens.

32. A projector according to claim 30, wherein said polarized light converting element is rotatably arranged in the projection lens.

* * * * *